(12) United States Patent
Bao et al.

(10) Patent No.: US 10,037,098 B2
(45) Date of Patent: Jul. 31, 2018

(54) METHODS AND APPARATUS CONCERNING SENSITIVE FORCE SENSORS

(71) Applicant: The Board of Trustees of the Leland Stanford Junior University, Stanford, CA (US)

(72) Inventors: Zhenan Bao, Stanford, CA (US); Alex L. Chortos, Stanford, CA (US); Ho-Hsiu Chou, Taipei (TW)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 20 days.

(21) Appl. No.: 15/222,529

(22) Filed: Jul. 28, 2016

(65) Prior Publication Data

US 2017/0031491 A1    Feb. 2, 2017

Related U.S. Application Data

(60) Provisional application No. 62/198,550, filed on Jul. 29, 2015.

(51) Int. Cl.
  *G06F 3/041* (2006.01)
(52) U.S. Cl.
  CPC .......... *G06F 3/0414* (2013.01); *G06F 3/0416* (2013.01)
(58) Field of Classification Search
  CPC .............................. G06F 3/0414; G06F 3/0416
  See application file for complete search history.

(56) References Cited

U.S. PATENT DOCUMENTS

| 4,251,215 | A  | 2/1981  | May et al.       |
|-----------|----|---------|------------------|
| 4,317,012 | A  | 2/1982  | Itoh             |
| 4,555,954 | A  | 12/1985 | Kim              |
| 7,230,198 | B2 | 6/2007  | Cok et al.       |
| 8,669,952 | B2 | 3/2014  | Hashimura et al. |
| 8,904,885 | B2 | 12/2014 | Ikebe et al.     |
| 9,112,058 | B2 | 8/2015  | Bao et al.       |
| 9,212,960 | B2 | 12/2015 | Lipomi et al.    |
| 9,281,415 | B2 | 3/2016  | Bao et al.       |

(Continued)

OTHER PUBLICATIONS

Somani, Prakash R., and S. Radhakrishnan. "Electrochromic materials and devices: present and future." Materials chemisiry and physics 77.1 (2003): 117-133.

(Continued)

*Primary Examiner* — Lisa Landis
(74) *Attorney, Agent, or Firm* — Crawford Maunu PLLC

(57) ABSTRACT

Embodiments in accordance with the present disclosure include apparatuses, devices, and methods. For example, an apparatus includes an electronic force sensor having a first opposing electrode and a second opposing electrode. The first and second opposing electrodes are configured to generate an output indicative of a force applied to the electronic force sensor. The electronic force sensor further includes a plurality of recoverably-deformable structures arranged between the first and the second opposing electrodes and having a plurality of conductive-resistive elements. Each of the recoverably-deformable structures including at least one of a variable conductor and a variable resistor and configured and arranged with attributes that set a force sensitivity of the electronic force sensor.

22 Claims, 34 Drawing Sheets

(56) References Cited

U.S. PATENT DOCUMENTS

| | | | |
|---|---|---|---|
| 2010/0265208 A1 | 10/2010 | Kim et al. | |
| 2012/0075241 A1* | 3/2012 | Bao | H01L 29/84 345/174 |
| 2012/0194450 A1 | 8/2012 | Goncalves et al. | |
| 2012/0293297 A1 | 11/2012 | Joguet et al. | |
| 2013/0082970 A1 | 4/2013 | Frey et al. | |
| 2013/0234734 A1* | 9/2013 | Iida | G06F 3/044 324/661 |
| 2014/0350348 A1 | 11/2014 | Tee | |
| 2015/0078634 A1 | 3/2015 | Mankowski | |
| 2015/0168236 A1 | 6/2015 | Bao et al. | |
| 2016/0033343 A1 | 2/2016 | Park et al. | |
| 2016/0051195 A1 | 2/2016 | Pang et al. | |

OTHER PUBLICATIONS

Ma, Dongyun, et al. "Hierarchical NiO microflake films with high coloration efficiency, cyclic stability and low power consumption for applications in a complementary electrochromic device." Nanoscale 5.11 (2013): 4808-4815. Abstract only.

Deutschmann, T., and E. Oesterschulze. "Integrated electrochromic iris device for low power and space-limited applications." Journal of Optics 16.7 (2014): 075301. Abstract only.

Yan, Chaoyi, et al. "Stretchable and wearable electrochromic devices." ACS nano 8.1 (2013): 316-322.

Olivier, Yoann, et al. "25th Anniversary Article: High-Mobility Hole and Electron Transport Conjugated Polymers: How Structure Defines Function." Advanced Materials 26.14 (2014): 2119-2136.

Kerszulis, Justin A., et al. "Follow the yellow brick road: structural optimization of vibrant yellow-to-transmissive ?electrochromic conjugated polymers." Macromolecules 47.16 (2014): 5462-5469. Abstract only.

Savagatrup, Suchol, et al. "Molecularly stretchable electronics." Chemistry of Materials 26.10 (2014): 3028-3041.

Österholm, Anna M., et al. "Four shades of brown: tuning of electrochromic polymer blends toward high-contrast eyewear." ACS applied materials & interfaces 7.3 (2015): 1413-1421. Abstract Only.

Ng, Tse Nga, et al. "Scalable printed electronics: an organic decoder addressing ferroelectric non-volatile memory." (2012).

Thakur, Vijay Kumar, et al. "Hybrid materials and polymer electrolytes for electrochromic device applications." Advanced Materials 24.30 (2012): 4071-4096.

Mortimer, Roger J. "Electrochromic materials." Annual review of materials research 41 (2011): 241-268. Abstract only.

Öktem, Gözde, et al. "Donor—acceptor type random copolymers for full visible light absorption." Chemical Communications 4713 (2011): 3933-3935.

Beverina, L., G. A. Pagani, and M. Sassi. "Multichromophoric electrochromic polymers: colour tuning of conjugated polymers through the side chain functionalization approach." Chemical Communications 50.41 (2014): 5413-5430. Abstract only.

Zhu, Yumin, et al. "Neutral color tuning of polymer electrochromic devices using an organic dye." Chemical Communications 50.60 (2014): 8167-8170. Abstract only.

Argun, Avni A., et al. "Multicolored electrochromism in polymers: structures and devices." Chemistry of Materials 16.23 (2004): 4401-4412.

O'Connor, Brendan, et al. "Correlations between mechanical and electrical properties of polythiophenes." ACS nano 4.12 (2010): 7538-7544.

O'Connor, Brendan, et al. "Anisotropic Structure and Charge Transport in Highly Strain-Aligned Regioregular Poly (3-hexylthiophene)." Advanced Functional Materials 21.19 (2011): 3697-3705.

Gargi, Deepak, et al. "Charge transport in highly face-on poly (3-hexylthiophene) films." The Journal of Physical Chemistry C 117.34 (2013): 17421-17428. Abstract only.

Wu, Hung-Chin, et al. "A rapid and facile soft contact lamination method: evaluation of polymer semiconductors for stretchable transistors." Chemistry of Materials 26.15 (2014): 4544-4551. Abstract only.

Kostarelos, Kostas. "The long and short of carbon nanotube toxicity." Nature biotechnology 26.7 (2008): 774-776. Abstract only.

Yamashita, Kohei, et al. "Carbon nanotubes elicit DNA damage and inflammatory response relative to their size and shape." Inflammation 33.4 (2010): 276-280. Abstract only.

Bélanger, Marie—Claire, and Yves Marois. "Hemocompatibility, biocompatibility, inflammatory and in vivo studies of primary reference materials low-density polyethylene and polydimethylsiloxane: A review." Journal of biomedical materials research 58.5 (2001): 467-477. Abstract only.

Axisa, Fabrice, et al. "Design and fabrication of a low cost implantable bladder pressure monitor." 2009 Annual International Conference of the IEEE Engineering in Medicine and Biology Society. IEEE, 2009.

Argun, Avni A., Ali Cirpan, and John R. Reynolds. "The First Truly All-Polymer Electrochromic Devices." Advanced Materials 15.16 (2003): 1338-1341.

Park, Jonghwa, et al. "Giant tunneling piezoresistance of composite elastomers with interlocked microdome arrays for ultrasensitive and multimodal electronic skins." ACS nano 8.5 (2014): 4689-4697. Abstract only.

Pan, Lijia, et al. "An ultra-sensitive resistive pressure sensor based on hollow-sphere microstructure induced elasticity in conducting polymer film." Nature communications 5 (2014).

Gong, Shu, et al. "A wearable and highly sensitive pressure sensor with ultrathin gold nanowires." Nature communications 5 (2014).

Chang, Wen-Yang, et al. "Flexible electronics sensors for tactile multiscanning." Review of Scientific Instruments 80.8 (2009): 084701.

Hillis, W. Daniel. "A high-resolution imaging touch sensor." The International Journal of Robotics Research 1.2 (1982): 33-44. Abstract only.

Ko, Hyunhyub, et al. "Multifunctional, flexible electronic systems based on engineered nanostructured materials." Nanotechnology 23.34 (2012): 344001.

Chou, Ho-Hsiu, et al. "A chameleon-inspired stretchable electronic skin with interactive colour changing controlled by tactile sensing." NATURE 6.8011 (2015).

Monk, Paul, Roger Mortimer, and David Rosseinsky. Electrochromism and electrochromic devices. Cambridge University Press, 2007. Book description provided.

Ferain, Isabelle, Cynthia A. Colinge, and Jean-Pierre Colinge. "Multigate transistors as the future of classical metal-oxide-semiconductor field-effect transistors." Nature 479.7373 (2011): 310-316. Abstract only.

Lundstrom, Mark. "Moore's law forever?." Science 299.5604 (2003): 210-211.

Theis, Thomas N., and Paul M. Solomon. "It's time to reinvent the transistor!." Science 327.5973 (2010): 1600-1601. Abstract only.

Chau, Robert, et al. "Integrated nanoelectronics for the future." Nature materials 6.11 (2007): 810-812. Abstract only.

Sun, Yugang, and John A. Rogers. "Inorganic semiconductors for flexible electronics." Advanced Materials 19.15 (2007): 1897-1916.

Forrest, Stephen R. "The path to ubiquitous and low-cost organic electronic appliances on plastic." Nature 428.6986 (2004): 911-918.

Sekitani, Tsuyoshi, and Takao Someya. "Stretchable, Large-area Organic Electronics." Advanced Materials 22.20 (2010): 2228-2246. Abstract only.

Kim, Dae-Hyeong, et al. "Stretchable, curvilinear electronics based on inorganic materials." Advanced Materials 22.19 (2010): 2108-2124.

Rogers, John A., Takao Someya, and Yonggang Huang. "Materials and mechanics for stretchable electronics." Science 327.5973 (2010): 1603-1607.

Roncali, Jean, Philippe Leriche, and Antonio Cravino. "From One-to Three-Dimensional Organic Semiconductors: In Search of the Organic Silicon?." Advanced materials 19.16 (2007): 2045-2060.

Ma, Hong, et al. "Interface engineering for organic electronics." Advanced Functional Materials 20.9 (2010): 1371-1388.

(56) References Cited

OTHER PUBLICATIONS

Service, Robert F. "New Age Semiconductors Pick up the Pace." Science (2000): 415-417. Summary only.
Abbel, Robert, et al. "Side-Chain Degradation of Ultrapure Π-Conjugated Oligomers: Implications for Organic Electronics." Advanced Materials 21.5 (2009): 597-602. Abstract only.
Heyns, Marc, and Wilman Tsai. "Ultimate scaling of CMOS logic devices with Ge and III—V materials." Mrs bulletin 34.07 (2009): 485-492. Abstract only.
Fan, Zhiyong, et al. "Toward the development of printable nanowire electronics and sensors." Advanced Materials 21.37 (2009): 3730-3743.
Krebs, Frederik C., Suren A. Gevorgyan, and Jan Alstrup. "A roll-to-roll process to flexible polymer solar cells: model studies, manufacture and operational stability studies." Journal of Materials Chemistry 19.30 (2009): 5442-5451 . Abstract only.
Krebs, Frederik C., et al. "A complete process for production of flexible large area polymer solar cells entirely using screen printing—first public demonstration." Solar Energy Materials and Solar Cells 93.4 (2009): 422-441. Abstract only.
Fan, Zhiyong, et al. "Three-dimensional nanopillar-array photovoltaics on low-cost and flexible substrates." Nature materials 8.8 (2009): 648-653.
Gelinck, G. H., et al. "Flexible active-matrix displays and shift registers based on solution-processed organic transistors." Nature materials 3.2 (2004): 106-110.
Mach, Peter, et al. "Monolithically integrated, flexible display of polymer-dispersed liquid crystal driven by rubber-stamped organic thin-film transistors." Applied Physics Letters 78.23 (2001): 3592-3594. Abstract only.
Gustafsson, G., et al. "Flexible light-emitting diodes made from soluble conducting polymers." Nature 357.6378 (1992): 477-479. Abstract only.
Cantatore, E., Geuns, T. C., Gelinck, G. H., van Veenendaal, E., Gruijthuijsen, A. F., Schrijnemakers, L, . . . & de Leeuw, D. M. (2007). A 13.56-MHz RFID System Based on Organic Transponders. IEEE Journal of Solid-State Circuits, 42(1).
Garnier, Francis, et al. "All-polymer field-effect transistor realized by printing techniques." Science 265.5179 (1994): 1684-1686. Abstract only.
Duan, Xiangfeng, et al. "High-performance thin-film transistors using semiconductor nanowires and nanoribbons." Nature 425.6955 (2003): 274-278. Abstract only.
McAlpine, Michael C., et al. "High-Performance Nanowire Electronics and Photonics on Glass and Plastic Substrates." Nano Lett 3.11 (2003).
Jin, Song, et al. "Scalable interconnection and integration of nanowire devices without registration." Nano Letters 4.5 (2004): 915-919.
Tao, Andrea, et al. "Langmuir-Blodgett silver nanowire monolayers for molecular sensing using surface-enhanced Raman spectroscopy." Nano Letters 3.9 (2003): 1229-1233.
Menard, E., et al. "A printable form of silicon for high performance thin film transistors on plastic substrates." Applied Physics Letters 84.26 (2004): 5398-5400.
Ahn, Jong-Hyun, et al. "Heterogeneous three-dimensional electronics by use of printed semiconductor nanomaterials." science 314. 5806 (2006): 1754-1757.
Fan, Zhiyong, et al. "Wafer-scale assembly of highly ordered semiconductor nanowire arrays by contact printing." Nano letters 8.1 (2008): 20-25.
Madsen, Morten, et al. "Nanoscale semiconductor "X" on substrate "Y"—processes, devices, and applications." Advanced Materials 23.28 (2011): 3115-3127.
Viventi, Jonathan, et al. "Flexible, Foldable, Actively Multiplexed, High-Density Electrode Array for Mapping Brain Activity in vivo." Nat Neurosci 14.12: 1599-1605.
Lacour, Stephanie P., et al. "Stretchable interconnects for elastic electronic surfaces." Proceedings of the IEEE 93.8 (2005):1459-1467.

Zhang, Dahl-Young, et al. "A stretchable form of single-crystal silicon for high-performance electronics on rubber substrates." Science 311.5758 (2006): 208-212.
Kim, Keun Soo, et al. "Large-scale pattern growth of graphene films for stretchable transparent electrodes." NATURE 457 (2009): 5.
Sekitani, Tsuyoshi, et al. "Rubberlike Stretchable Active Matrix Using Elastic Conductors." Science (2008). Abstract only.
Sekitani, Tsuyoshi, et al. "Stretchable active-matrix organic light-emitting diode display using printable elastic conductors." Nature materials 8.6 (2009): 494-499.
Arzt, Eduard, Stanislav Garb, and Ralph Spolenak. "From micro to nano contacts in biological attachment devices." PNAS 100.19 (2003): 10603-10606.
Murphy, Michael P., Burak Aksak, and Metin Sitti. "Adhesion and anisotropic friction enhancements of angled heterogeneous microfiber arrays with spherical and spatula tips." Journal of Adhesion Science and Technology 21.12-13 (2007): 1281-1296.
Zhao, Yang, et al. "Interfacial energy and strength of multiwalled-carbon-nanotube-based dry adhesive." Journal of Vacuum Science & Technology B 24.1 (2006): 331-335.
Qu, Liangti, and Liming Dai. "Gecko-Foot-Mimetic Aligned Single-Walled Carbon Nanotube Dry Adhesives with Unique Electrical and Thermal Properties." Advanced materials 19.22 (2007): 3844-3849.
Lee, Jongho, Ronald S. Fearing, and Kyriakos Komvopoulos. "Directional adhesion of gecko-inspired angled microfiber arrays." Applied Physics Letters 93.19 (2008): 191910.
Ko, Hyunhyub, et al. "Hybrid core—shell nanowire forests as self-selective chemical connectors." Nano letters 9.5 (2009): 2054-2058.
Kapadia, Rehan, et al. "Hybrid core-multishell nanowire forests for electrical connector applications." Applied Physics Letters 94 (2009): 263110.
Zhu, Jia, et al. "Nanodome Solar Cells with Efficient Light Management and Self-Cleaning." (2010).
Barthlott, Wilhelm, and Christoph Neinhuis. "Purity of the sacred lotus, or escape from contamination in biological surfaces." Planta 202.1 (1997): 1-8.
Blossey, Ralf. "Self-cleaning surfaces—virtual realities." (2003).
Lafuma, Aurélie, and David Quéré. "Superhydrophobic states." Nature materials 2.7 (2003): 457-460.
Sun, Taolei, et al. "Bioinspired surfaces with special wettability." Accounts of Chemical Research 38.8 (2005): 644-652.
Li, Xue-Mei, David Reinhoudt, and Mercedes Crego-Calama. "What do we need for a superhydrophobic surface? A review on the recent progress in the preparation of superhydrophobic surfaces." Chemical Society Reviews 36.8 (2007): 1350-1368.
Ma, Minglin, and Randal M. Hill. "Superhydrophobic surfaces." Current opinion in colloid & interface science 11.4 (2006): 193-202. Abstract only.
Bhushan, Bharat. "Biomimetics: lessons from nature—an overview." Philosophical Transactions of the Royal Society of London A: Mathematical, Physical and Engineering Sciences 367.1893 (2009): 1445-1486.
Lau, Kenneth KS, et al. "Superhydrophobic carbon nanotube forests." Nano letters 3.12 (2003): 1701-1705.
Erbil, H. Yildirim, et al. "Transformation of a simple plastic into a superhydrophobic surface." Science 299.5611 (2003): 1377-1380.
Bravo, Javier, et al. "Transparent superhydrophobic films based on silica nanoparticles." Langmuir 23.13 (2007): 7293-7298. Abstract only.
Fürstner, Reiner, et al. "Wetting and self-cleaning properties of artificial superhydrophobic surfaces." Langmuir 21.3 (2005): 956-961.
Chiou, Nan-Rong, et al. "Growth and alignment of polyaniline nanofibres with superhydrophobic, superhydrophilic and other properties." Nature nanotechnology 2.6 (2007): 354-357.
Koch, Kerstin, et al. "Fabrication of artificial Lotus leaves and significance of hierarchical structure for superhydrophobicity and low adhesion." Soft Matter 5.7 (2009): 1386-1393. Abstract only.
Shieh, Jiann, et al. "Robust airlike superhydrophobic surfaces." Advanced Materials 22.5 (2010): 597-601 . Abstract only.

(56) References Cited

OTHER PUBLICATIONS

Verho, Tuukka, et al. "Mechanically durable superhydrophobic surfaces." Advanced Materials 23.5 (2011): 673-678.
Ko, Hyunhyub, et al. "Wet and Dry Adhesion Properties of Self-Selective Nanowire Connectors." Advanced Functional Materials 19.19 (2009): 3098-3102.
Nosonovslcy, Michael, and Bharat Bhushan. "Biologically inspired surfaces: broadening the scope of roughness." Advanced Functional Materials 18.6 (2008): 843-855. Abstract only.
Zhu, Lingbo, et al. "Superhydrophobicity on two-tier rough surfaces fabricated by controlled growth of aligned carbon nanotube arrays coated with fluorocarbon." Langmuir 21.24 (2005): 11208-11212. Abstract only.
Liu, Xuanjie, et al. "ZnS/Ag/ZnS nano-multilayer films for transparent electrodes in flat display application." Applied Surface Science 183.1 (2001): 103-110. Abstract only.
Ho, Jyh-Jier, et al. "Ion-assisted sputtering deposition of antireflection film coating for flexible liquid-crystal display applications." Applied optics 44.29 (2005): 6176-6180. Abstract only.
Hoshino, Tetsuya, Masahide Itoh, and Toyohiko Yatagai. "Antireflective grating in the resonance domain for displays." Applied optics 46.5 (2007): 648-656. Abstract only.
Prevo, Brian G., Emily W. Hon, and Orlin D. Velev. "Assembly and characterization of colloid-based antireflective coatings on multicrystalline silicon solar cells." Journal of Materials Chemistry 17.8 (2007): 791-799. Abstract only.
Koynov, Svetoslav, Martin S. Brandt, and Martin Stutzmann. "Black nonreflecting silicon surfaces for solar cells." Applied Physics Letters 88.20 (2006): 203107.
Hillis, W. Daniel. "A high-resolution imaging touch sensor." The International Journal of Robotics Research 1.2 (1982): 33-44.
Pang, Changhyun, et al. "A flexible and highly sensitive strain-gauge sensor using reversible interlocking of nanofibres." Nature materials 11.9 (2012): 795-801.
Park, Jonghwa, et al. "Giant tunneling piezoresistance of composite elastomers with interlocked microdome arrays for ultrasensitive and multimodal electronic skins." ACS nano 8.5 (2014): 4689-4697.
Choong, Chwee-Lin, et al. "Highly stretchable resistive pressure sensors using a conductive elastomeric composite on a micropyramid array." Advanced Materials 26.21 (2014): 3451-3458.
Hammock, Mallory L, et al. "25th Anniversary Article: The Evolution of Electronic Skin (E-Skin): A Brief History, Design Considerations, and Recent Progress." Advanced Materials 25.42 (2013): 5997-6038.
Dahiya, Ravinder S., et al. "Tactile sensing—from humans to humanoids." IEEE Transactions on Robotics 26.1 (2010): 1-20.
Dahiya, Ravinder S., et al. "Directions toward effective utilization of tactile skin: A review." IEEE Sensors Journal 13.11 (2013):4121-4138.
Kim, Dae-Hyeong, et al. "Epidermal electronics." science 333.6044 (2011): 838-843.
Takei, Kuniharu, et al. "Nanowire active-matrix circuitry for low-voltage macroscale artificial skin." Nature materials 9.10 (2010): 821-826.
Mannsfeld, Stefan CB, et al. "Highly sensitive flexible pressure sensors with microstructured rubber dielectric layers." Nature materials 9.10 (2010): 859-864.
Lipomi, Darren J., et al. "Skin-like pressure and strain sensors based on transparent elastic films of carbon nanotubes." Nature nanotechnology 6.12 (2011): 788-792. Abstract Only.
Lipomi, Darren J., et al. "Stretchable organic solar cells." Advanced Materials 23.15 (2011): 1771-1775. Abstract Only.
Kaltenbrunner, Martin, et al. "An ultra-lightweight design for imperceptible plastic electronics." Nature 499.7459 (2013): 458-463.
Tee, Benjamin CK, et al. "An electrically and mechanically self-healing composite with pressure-and flexion-sensitive properties for electronic skin applications." (2012).
White, Matthew S., et al. "Ultrathin, highly flexible and stretchable PLEDs." Nature Photonics 7.10 (2013): 811-816.
Liang, Jiajie, et al. "Elastomeric polymer light-emitting devices and displays." Nature Photonics 7.10 (2013): 817-824.
Wang, Chuan, et al. "User-interactive electronic skin for instantaneous pressure visualization." Nature materials 12.10 (2013): 899-904.
Lumelsky, Vladimir, Michael S. Shur, and Sigurd Wagner. "Sensitive skin." Selected topics in electronics and systems 18 (2000).
Kim, Rak-Hwan, et al. "Waterproof AlInGaP optoelectronics on stretchable substrates with applications in biomedicine and robotics." Nature materials 9.11 (2010): 929-937.
Someya, Takao, et al. "A large-area, flexible pressure sensor matrix with organic field-effect transistors for artificial skin applications." Proceedings of the National Academy of Sciences of the United States of America 101.27 (2004): 9966-9970.
Schwartz, Gregor, et al. "Flexible polymer transistors with high pressure sensitivity for application in electronic skin and health monitoring." Nature Communications 4 (2013): 1859.
Yu, Zhibin, et al. "Intrinsically Stretchable Polymer Light-Emitting Devices Using Carbon Nanotube-Polymer Composite Electrodes." Advanced materials 23.34 (2011): 3989-3994. Abstract Only.
Gerratt, Aaron P., Hadrien O. Michaud, and Stéphanie P Lacour. "Elastomeric electronic skin for prosthetic tactile sensation." Advanced Functional Materials 25.15 (2015): 2287-2295. Abstract Only.
Gerratt, Aaron P., et al. "Stretchable capacitive tactile skin on humanoid robot fingers—First experiments and results." 2014 IEEE-RAS International Conference on Humanoid Robots. IEEE, 2014.
Graz, Ingrid, et al. "Flexible active-matrix cells with selectively poled bifunctional polymer-ceramic nanocomposite for pressure and temperature sensing skin." Journal of Applied Physics 106.3 (2009): 034503.
Michaud, Hadrien O., Joan Teixidor, and Stéphanie P. Lacour. "Soft flexion sensors integrating strechable metal conductors on a silicone substrate for smart glove applications." 2015 28th IEEE International Conference on Micro Electro Mechanical Systems (MEMS). IEEE, 2015.
Kim, Jaemin, et al. "Stretchable silicon nanoribbon electronics for skin prosthesis." Nature communications 5 (2014).
Son, Donghee, et al. "Multifunctional wearable devices for diagnosis and therapy of movement disorders." Nature Nanotechnology 9.5 (2014): 397-404. Abstract only.
Jung, Sungmook, et al. "Fabric-Based Integrated Energy Devices for Wearable Activity Monitors." Advanced Materials 26.36 (2014): 6329-6334. Abstract only.
Teyssier, Jérémie, et al. "Photonic crystals cause active colour change in chameleons." NATURE 6.6368 (2015).
Bauer, Siegfried, et al. "25th Anniversary Article: A Soft Future: From Robots and Sensor Skin to Energy Harvesters." Adv. Mater 26 (2014): 150-162.
Haque, Md Anamul, et al. "Rapid and reversible tuning of structural color of a hydrogel over the entire visible spectrum by mechanical stimulation." Chemistry of Materials 23.23 (2011): 5200-5207. Abstract only.
Zhao, Qibin, et al. "Electric-field-tuned color in photonic crystal elastomers." Applied Physics Letters 100.10 (2012): 101902.
van den Ende, Daan, et al. "Voltage-Controlled Surface Wrinkling of Elastomeric Coatings." Advanced Materials 25.25 (2013): 3438-3442.
Morin, Stephen A., et al. "Camouflage and display for soft machines." Science 337.6096 (2012): 828-832.
Yu, Cunjiang, et al. "Adaptive optoelectronic camouflage systems with designs inspired by cephalopod skins." Proceedings of the National Academy of Sciences 111.36 (2014): 12998-13003.
Wang, Qiming, et al. "Cephalopod-inspired design of electromechano-chemically responsive elastomers for on-demand fluorescent patterning." Nature communications 5 (2014).
Wu, Wenzhuo, Xiaonan Wen, and Zhong Lin Wang. "Taxel-addressable matrix of vertical-nanowire piezotronic transistors for active and adaptive tactile imaging." Science 340.6135 (2013): 952-957.

(56) References Cited

OTHER PUBLICATIONS

Metzger, Christian, et al. "Flexible-foam-based capacitive sensor arrays for object detection at low cost." Applied Physics Letters 92.1 (2008): 013506. Abstract only.
Graz, Ingrid, et al. "Flexible ferroelectret field-effect transistor for large-area sensor skins and microphones." Applied physics letters 89.7 (2006): 073501. Abstract only.
Takahashi, Toshitake, et al. "Carbon nanotube active-matrix backplanes for conformal electronics and sensors." Nano letters 11.12 (2011): 5408-5413.
Pang, Changhyun, et al. "A flexible and highly sensitive strain-gauge sensor using reversible interlocking of nanotibres." Nature materials 11.9 (2012): 795-801.
Yamada, Takeo, et al. "A stretchable carbon nanotube strain sensor for human-motion detection." Nature nanotechnology 6.5 (2011): 296-301.
Tee, Benjamin C-K., et al., "Tunable flexible pressure sensors using microstructured elastomer geometries for intuitive electronics." Advanced Functional Materials 24.34 (2014): 5427-5434.
Wang, Xuewen, et al. "Silk-molded flexible, ultrasensitive, and highly stable electronic skin for monitoring human physiological signals." Advanced Materials 26.9 (2014): 1336-1342.

\* cited by examiner

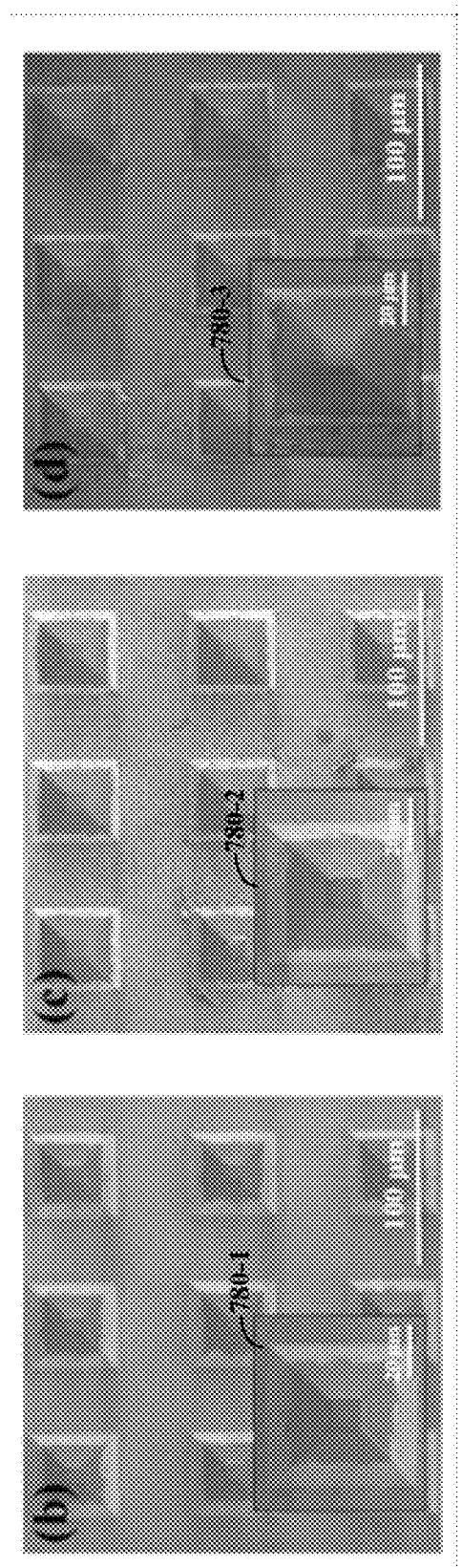

FIG.14A
FIG.14B
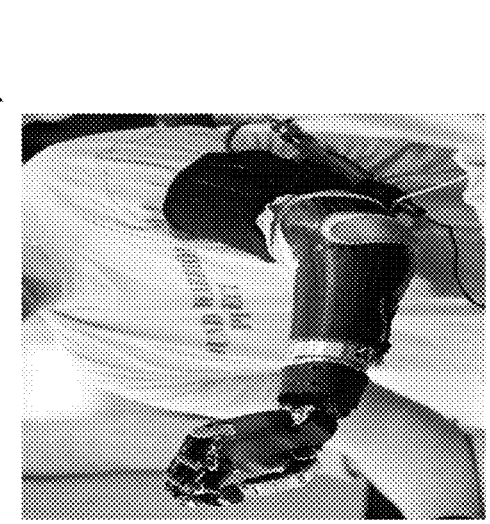
FIG.14C

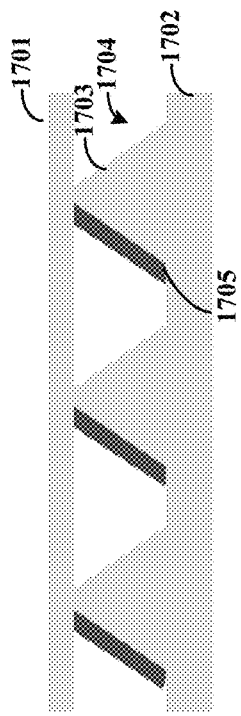
FIG.17A
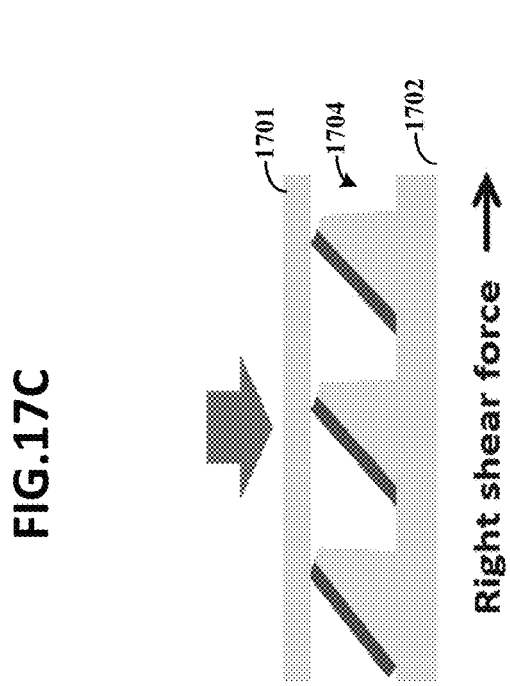
FIG.17C
FIG.17D
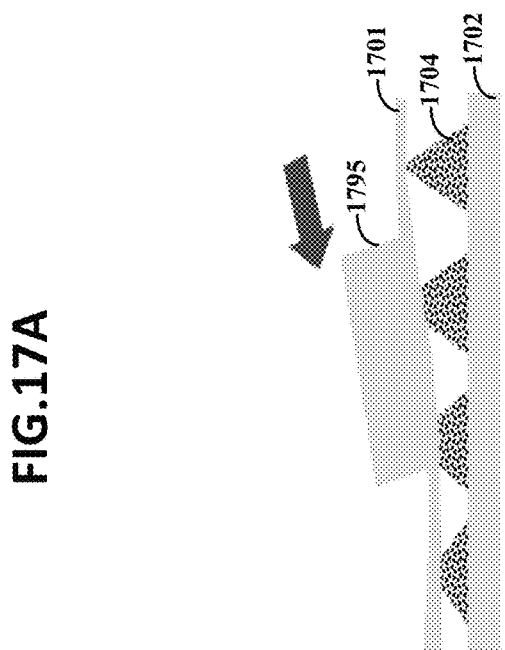
FIG.17B

METHODS AND APPARATUS CONCERNING SENSITIVE FORCE SENSORS

OVERVIEW

Human or other animal skin provides a remarkable network of sensitive diverse sensors that provide sensitive pressure, temperature and vibration sensing. Skin can transduce environmental stimuli into physiological signals, which are then interpreted by the brain. Further, some animal, reptile or insect skin exhibits additional properties, such as the chameleon and cephalopod that have the capability to change their skin color. Various force sensors and devices may attempt to mimic properties of human or animal skin to provide a variety of features.

The above issues as well as others have presented challenges to force sensors for a variety of applications.

SUMMARY

The present invention is directed to overcoming the above-mentioned challenges and others related to the types of devices discussed above and in other implementations. The present invention is exemplified in a number of implementations and applications, some of which are summarized below as examples.

Various aspects of the present disclosure are directed to a flexible electronic force sensor that responds to different forces and/or stimuli and is used to detect the different forces or stimuli by providing an output indicative of the force applied to the force sensor.

A number of specific aspects are directed to an apparatus that includes an electronic force sensor and sensor circuitry. The electronic force sensor includes first and second opposing electrodes and a plurality of recoverably-deformable structures arranged between. The first and second opposing electrodes generate an output indicative of force applied to the electronic force sensor (e.g., a capacitance or resistance value). The plurality of recoverably-deformable structures have attributes that set a force sensitivity of the electronic force sensor. For example, the plurality of recoverably-deformable structures have a plurality of conductive-resistive elements. Further, each of the plurality of recoverably-deformable structures is a variable conductor or variable resistor. Example attributes that set the force sensitivity include shape and material composition attributes. The sensor circuitry receives the output from the electronic force sensor and outputs a signal indicative of the amount of force applied based on the output (e.g., based on a capacitance or resistance output by the electronic force sensor, an electronic signal indicative of the amount of force applied is output).

In other specific embodiments, an electronic force sensor includes a first opposing electrode and a second opposing electrode that generate the output indicative of force applied to the electronic force sensor. The electronic force sensor further includes a plurality of recoverably-deformable structures arranged between the first and second opposing electrode and have a plurality of resistive-conductive elements. Further, each of the plurality of recoverably-deformable structures is a variable conductor or variable resistor. The plurality of recoverably-deformable structures have conductive material and non-conductive material that sets a force sensitivity of the electronic force sensor.

Other specific embodiments are directed to an apparatus which includes an electronic force sensor and sensor circuitry. The electronic force sensor includes circuitry to generate an output indicative of a force applied to the electronic force sensor. The circuitry includes a plurality of structures having a conductive portion and a resistive portion. The structures can have attributes, including a shape and material composition attributes, that are set with respect to one another for the purpose of setting force sensitivity of the electronic force sensor. The sensor circuitry outputs a signal indicative of the amount of force applied based on the output from the electronic force sensor.

A number of specific embodiments are directed to methods including curing a non-conductive material to form a film including an opposing electrode with a plurality of recoverably-deformable structures, applying a coating of a conductive material to the plurality of recoverably-deformable structures, and applying tape to remove portions of the conductive material. The resistivity of the plurality of recoverably-deformable structures and/or a threshold of resistance switching range of the electronic force sensor is set based on an amount of conductive material used and/or a location of the conductive material on the recoverably-deformable structures. Further, the threshold of resistance switching range can be tuned by applying a particular amount of coatings of the conductive material and/or removing a particular portion of the conductive material using the tape.

Other specific method embodiments include curing a non-conductive material with conductive material to form a film including an opposing electrode and curing conductive and/or non-conductive material in multiple steps to form a plurality of recoverably-deformable structures extending from the opposing electrodes and that have different ratios of the conductive material to the non-conductive material through cross-sections of the plurality of recoverably-deformable structures. The resistivity of the plurality of recoverably-deformable structures and/or a threshold of resistance switching range of the electronic force sensor is set based on an amount of conductive material used and/or a location of the different ratios of conductive material to non-conductive material through cross-sections of the plurality of recoverably-deformable structures. The threshold of resistance switching range can be tuned by curing a particular ratio of the conductive material to the non-conductive material at particular cross-sections of the plurality of recoverably-deformable structures.

The above overview is not intended to describe each illustrated embodiment or every implementation of the present invention. The figures and detailed description that follow more particularly exemplify these embodiments.

BRIEF DESCRIPTION OF THE DRAWINGS

Various example embodiments may be more completely understood in consideration of the following detailed description in connection with the accompanying drawings, in which:

FIGS. 7B-D illustrate examples of formed recoverably-deformable structures using the process of FIG. 7A, in accordance with various embodiments;

FIGS. 14A-14C illustrate example implementations of an electronic force sensor, in accordance with various embodiments;

FIGS. 17A-17D illustrates examples of specific electronic force sensors that respond to shear force, in accordance with various embodiments;

Figure 1A:
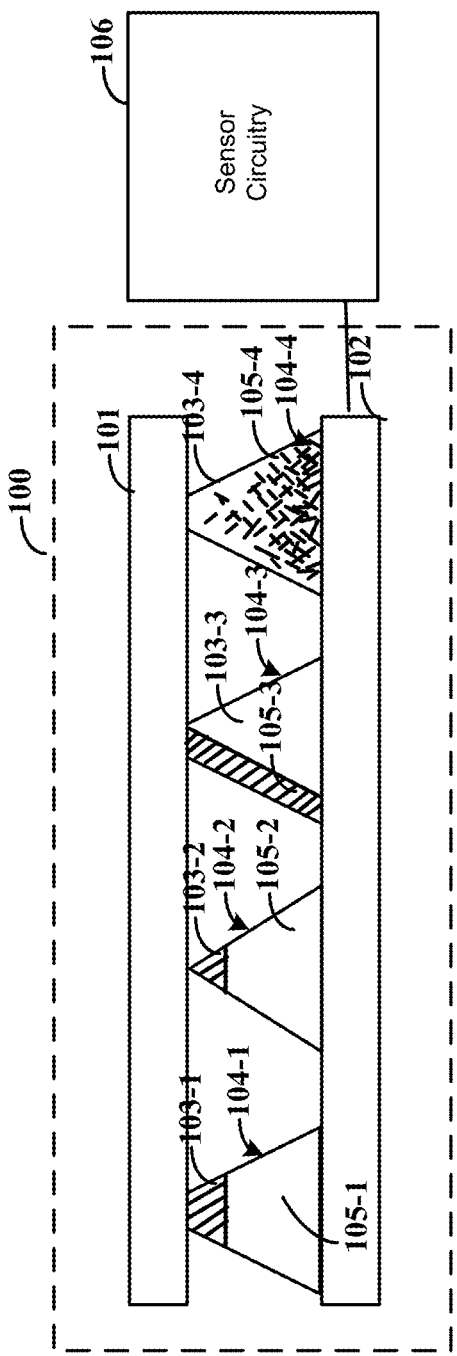
FIGS. 1A-1C illustrate examples of an apparatus in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of devices, systems and arrangements involving tactile sensors and electronic force sensors. The electronic force sensor can include a plurality of recoverably-deformable structures between circuitry (e.g., opposing electrodes) that selectively have conductive material and non-conductive material to set a force sensitivity of the sensor. In certain implementations, aspects of the present disclosure have been shown to be beneficial when used in the context of electronic sensing applications which are realized using sensors with recoverably-deformable structures configured to preserve power usage. While the present invention is not necessarily limited to such applications, various aspects of the invention may be appreciated through a discussion of various examples using this context.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

As with the remarkable network of sensitive diverse sensors provided by human skin, specific aspects of the present disclosure are applicable for tactile sensing, health monitoring, and temperature sensing. Consistent with various embodiments, electronic force sensors of the present disclosure are able to convert mechanical stimuli into signals, which are then interpreted as beneficial to the particular application. As with human skin, particular embodiments include electronic skin (e-skin) devices which mimic properties of human skin for applications such as wearable devices, artificial prosthetics, health monitoring and smart robots. In this context, e-skin is an artificial skin that mimics properties of skin using surface-interfacing structures which are integrated with electronics (e.g., electronic circuitry). In various embodiments, the electronic force sensor device includes a low-power consumption electronics system with integrated structures relevant for e-skin applications. The electronic force sensor can be stretchable, tunable tactile sensors which can change colors through the integration of a stretchable organic eletrochromic device (ECD). The force sensor can detect applied forces, distinguish between different forces or events, and provide visual indication of the force through visible color change.

The present disclosure also addresses numerous other properties (or parameters). An example specific implementation of an electronic force sensor in accordance with the present disclosure concerns tactile sensing and stretchability. Tactile sensing allows for communication with the external devices (or outside environment), while stretchability (as with human skin) enables relatively free movement. Other properties are directed to the capability to change the color of the skin-like interface. Yet further properties, as may be applicable to biomimetic applications, permit for changes in coloration to control temperature and/or communication, similar to how a chameleon can control its pigment cells and change its coloration for purposes of camouflage, temperature maintenance, and communication. In some implementations, certain of these properties are combined for a more complex integration of application-specific advantages, such as to provide stretchability, color-changing, and tactile sensing.

In accordance with various embodiments, aspects of the present disclosure include force sensors and apparatuses that surprisingly show an all-solution processed chameleon-inspired stretchable electronic (e)-skin, in which the e-skin color can be controlled through varying the applied force along with the applied force duration. The color change can also be utilized to distinguish the force applied to the electronic force sensor. The integration of the stretchable, tunable resistive force sensor and the fully stretchable organic electrochromic device affords a stretchable electrochromically-active e-skin with tactile sensing control. This system has a range of specific implementations, such as interactive wearable devices, artificial prosthetics, and smart robots.

Various other embodiments of the present disclosure are directed toward apparatuses and methods that include a user-interactive and color-tunable electronic force sensor that can both detect and distinguish between various forces through real-time absorption change. In addition, the different forces accompanied with corresponding absorption bands in the system demonstrate that a physical color of the electronic force sensor can be controlled through applying various forces. Alternatively and/or in addition, the controllable color change can be utilized to identify various forces, such as pressure, strain, flow, etc. Such electronic force sensors can include stretchable and ultrathin carbon-based electrochromic devices that have a resistance or capacitance and/or switching range of the sensors tuned. For example, the device can be a camouflaged electronic force sensor with tactile sensing control. The electronic force sensor can integrate color-tunable properties and tactile sensing abilities, and can be used in diverse applications in health monitoring, interactive and wearable devices, military applications, artificial prosthetics, and smart robots.

Many of the sensors described herein are directed to electronic force sensing applications in technologies such as, but not limited to, robotics, prosthetics, hand-held devices, touch screen devices, as well as applications in physiological signal monitoring and healthcare. For example, an electronic skin pressure sensor can be implemented as a part of a wearable device, such as a wrist wearable-device (e.g., a smart watch), a biomedical chest-worn wearable device, or otherwise.

Advantageously and as an option for certain specific embodiments, the electronic force sensor can be manufactured separately from the sensor circuit. The separately-made force sensor and sensor circuit can then be assembled or cooperatively arranged as appropriate for the application/end-use (e.g., wearable or prosthetic). Further, the circuit-specific aspects of the electronic force sensors can be implemented simply as electrodes, with at least one of the electrodes including a plurality of structures exhibiting resistivity and/or partial conductivity in response to applied force (e.g., partially covered or topped with a conductive material or including a conductive material within).

The electronic force sensor can include a resistive or capacitive force sensor that includes circuitry as or with opposing electrodes, in various aspects. A plurality of recoverably-deformable structures are located between the opposing electrodes and set a force sensitivity of the electronic force sensor. The plurality of recoverably-deformable structures can have a plurality of conductive-resistive elements which include conductive portions and resistive portions, as further described herein. At least one of the first and second opposing electrodes can be formed with the plurality of recoverably-deformable structures as a film.

In specific embodiments, the recoverably-deformable structures/features can be associated with, located on, and/or in contact with one of the opposing electrodes. There can be no and/or minimal conductive material located on a surface of the recoverably-deformable structures that initially contacts the other opposing electrode (e.g., the initial contacting surface). A change in conduction can occur after pressure and/or shear force is applied. Certain aspects of the present disclosure include force sensors without conductive material and/or with minimal conductive material on the initial contacting surface, resulting in low power consumption when no pressure or shear force (or minimal pressure/shear force) is applied, and a change in conduction after applied pressure or shear force. This can result in mitigation of (or no) consumption of power when no force is applied. For force sensors that are battery operated, this can increase the life of the battery.

The recoverably-deformable structures can provide a resistance that is above hundreds of kOhms when no force is applied to the electronic force sensor. The electronic force sensor can be in a low power consumption state and/or an off state when the resistivity is above the hundreds of kOhms. The range of threshold resistance of switching ratio (e.g., on/off ratio range) of an electronic force sensor can include a range of less than 1. As an example, a range of the on/off ratio can be 1E-2 or below. In specific examples, the range is 1E-3 or below and includes an infinite resistance at the off-state. In related examples, the contact resistance at the maximum resistance of the electronic force sensor can be in a range of 1E10 Ohms to 1E3 Ohms or above including an infinite resistance in the off-state with a power consumption at the maximum resistance including 1E-3 watts or less (e.g., 1E-10 watts). Further, the resistance decreases can be provided for a force (e.g., pressure) range of 0-400 kPa in an example implementation and in another example implementation, for a force range of 0-400 MPa. When force is applied (e.g., an on-state), the resistance can decrease, by one or more orders of magnitudes. For example, the resistance can decrease until a threshold resistance of switching range is reached, at which time, the electronic force sensor can become conductive enough to provide current flow. The threshold resistance of switching range can act like a switch, resulting in the electronic force sensor changing from the low power consumption state and/or off-state to a higher power consumption state and/or on-state. With greater amounts of force, a greater reduction in resistance can occur. Thereby, the resistance of the electronic force sensor inversely scales with the amount of force applied and the resistance and/or conductivity of the electronic force sensor can be used to quantify the amount of force applied. Such force sensors can be analog and/or digital.

In some related embodiments, the apparatus further includes a polymer layer configured and arranged with the sensor circuitry to change the physical color of the electronic force sensor. The change in physical color includes different colors and/or different intensities of one or more colors and/or is indicative of an amount of force applied. The polymer layer, in various embodiments, include an electrochromic material (e.g., an electrochromic device). The polymer layer can, for example, be integrated into a portion of a wearable-device and/or in communication (e.g., wireless or wired) with circuitry associated with the wearable device (e.g., a watch strap of a smart-watch or directly into clothing, such as a shirt) or into a portion of a prosthetic and/or smart robot. The electronic force sensor and/or sensor circuitry can be integrated into and/or with a different portion of the wearable-device (e.g., into the circuitry of the smart-watch), prosthetic and/or smart robot, and can be in communication (wireless and/or wired) with the polymer layer/electrochromic device.

Various other embodiments of the present disclosure are directed to a method of forming an apparatus as exemplified or supported by aspects of the underlying description/embodiments including curing a non-conductive material to form the recoverably-deformable structures, applying a coating of a conductive material to the formed recoverably-deformable structures, and applying tape to remove portions of the conductive material, and/or curing the conductive and/or non-conductive material in multiple steps to form different ratios of the conductive material to the non-conductive material. The multiple steps, in various embodiments, can include curing and/or partially curing a portion of the recoverably-deformable structures and, after the cure/partial cure, curing and/or partially curing another portion of the recoverably-deformable structures.

The recoverably-deformable structures, consistent with the various aspects of the present disclosure, can be various shapes and/or have various levels of stiffness (or elasticity), such as pyramid, pillar, square, hexagon column, and/or symmetric or asymmetric structures, among other shapes. The structures may be connected or may be discrete unconnected structures. The recoverably-deformable structures can be formed of a non-conductive material and partially coated with a conductive material. The conductive material, in various embodiments, can include nanostructures, such as carbon nanotubes, nanowires, metal, conductive polymer and/or other conductive material. Structures that are partially covered in a conductive material can provide a higher resistivity in response to no force or low force applied than a resistivity provided in response to a greater force applied. For example, when the recoverably-deformable structures provide higher resistivity, the apparatus and/or electronic force sensor can be in a low power consumption state. The structures can also be made of conductive materials embedded inside the recoverably-deformable structures. The conductive material, in various embodiments, can include nanostructures, such as carbon nanotubes, nanowires, metal, conductive polymer and/or other conductive material. The conductive material forms at least one conductive pathway inside one or more (e.g., each) of the recoverably-deformable structures. The conductivity may vary at different cross-sections of the recoverably-deformable structures.

The resistivity of the recoverably-deformable structures and/or a threshold resistance switching range of the electronic force sensor can be tunable based on an amount of conductive material covering the recoverably-deformable structures and/or a location of the conductive material on and/or within the recoverably-deformable structures. For example, the conductive material can be arranged on a top of the recoverably-deformable structures, a side of the recoverably-deformable structures, and/or multiple sides of the recoverably-deformable structures. In accordance with some aspects of the present disclosure, the conductive material is arranged on multiple sides of the recoverably-deformable structures in different concentrations on each side of the recoverably-deformable structures, such that the recoverably-deformable structures provide different resistivity in response to the same amount of force applied in different directions. The electronic force sensor can differentiate between different stimuli based on the different resistivity (e.g., the force sensor circuitry can based on outputs from the electronic force sensor). Top of the recoverably-deformable structures, as used herein, can refer to or include the initial contact surface and/or a surface of the recoverably-deformable structures that is proximal to and/or closest to (as compared to other surfaces of the recoverably-deformable structures) an opposing electrode. Bottom of the recoverably-deformable structures can refer to or include a surface that is opposite to the initial contact surface and/or closest to the electrode that is opposite of the opposing electrode. In various embodiments, the recoverably-deformable structures are formed on a film, with the recoverably-deformable structures formed of the same conductive or non-conductive material as the film and the film including an electrode (e.g., the bottom electrode) of the electronic force sensor.

In various implementations, the conductive material can be located within the plurality of recoverably-deformable structures as a ratio of conductive material to non-conductive material. The conductive material can be arranged at a higher ratio compared to the non-conductive material at a base portion and/or bottom of the recoverably-deformable microstructures and/or can be arranged within the plurality of recoverably-deformable structures in multiple layers. The bottom of the recoverably-deformable structures can include a portion that is opposite to the top (e.g., surface that is proximal to the electrode the recoverably-deformable structures are formed on). For example, the circuitry of the electronic force sensor can include first and second opposing electrodes, and the conductive material is located within the plurality of recoverably-deformable structures proximal to the first opposing electrode and not located and/or located at a low ratio compared to the non-conductive material proximal to the second opposing electrode.

The resistive portion (e.g., pressure, strain, or flow force opposing portion) of the structures can include the top/upper portion of the recoverably-deformable structures that includes a non-conductive material and/or is not covered in a conductive material, at least one side portion of the recoverably-deformable structures include a non-conductive material and/or is not covered in a conductive material, and/or can be within the recoverably-deformable structures at the top/upper portion of the recoverably-deformable structures or within multiple layers with a conductive material arranged within the plurality of recoverably-deformable structures as a ratio of conductive material to non-conductive material.

Turning now to the figures, FIG. 1A illustrates an example of an apparatus in accordance with various embodiments. As illustrated, the apparatus can include an electronic force sensor 100. The electronic force sensor 100 is a flexible device comprised of multiple layers that can respond to a force applied, as described herein. The force, in various embodiments and specific implementations, can include pressure, shear force, strain, flow forces, directional force, among other forces and combinations thereof. In various embodiments, the apparatus includes sensor circuitry 106 to process outputs from the electronic force sensor 100 and output an electronic signal that is indicative of the amount of force applied to the electronic force sensor 100.

The electronic force sensor 100 includes circuitry. For example, the circuitry includes a first opposing electrode 101 and a second opposing electrode 102. The first and second opposing electrodes 101, 102 can be conductive sheets of material supported on rigid, flexible, and/or stretchable substrates. Example rigid substrates can include or be implemented using glass, steel, and/or plastic, among other rigid material. Example flexible substrates can include or be implemented using plastic (polyester, polycarbonate, polyimide, polyamide, polyurathene, polyethylene, polypropylene), flexible glass, and/or steel, among other flexible material. Example stretchable substrates can include or be implemented using silicon elastomer, Polydimethylsiloxane (PDMS), crosslinked perfluoropolyether (PFPE), polyurathene, polystyrene-polybutyldiene-polystyrene, and/or fluorinated elastomers, such as poly(vinylidene fluoride-hexafluoropropylene) (PVDF-HFP), among other stretchable material. Example electrode (conductive) material can include nanostructures, such as carbon nanotubes, nanowires, metal, conductive polymer, graphene and/or other conductive materials. The first and second opposing electrodes 101, 102 are used to generate an output indicative of force applied to the electronic force sensor 100, as described further herein.

The electronic force sensor 100 includes a plurality of recoverably-deformable structures 104-1, 104-2, 104-3, 104-4 (herein generally referred to as "the plurality of recoverably-deformable structures 104"). A recoverably-deformable structure can include or refer to an elastic object that responds to a force applied thereto by deforming and recovering from the deformation in response to removal of the force. In various embodiments, the recoverably-deformable structures 104 recover to their original (e.g., pre-force) shape after the force is removed. The plurality of recoverably-deformable structures 104 are arranged between the first and second opposing electrodes 101, 102 and set a force sensitivity of the electronic force sensor 100. For example, the plurality of recoverably-deformable structures 104 have a plurality of conductive-resistive elements 103-1, 103-2, 103-3, 103-4, 105-1, 105-2, 105-3, 105-4. The conductive-resistive elements 103-1, 103-2, 103-3, 103-4, 105-1, 105-2, 105-3, 105-4 can include conductive portions and resistive portions of the plurality of recoverably-deformable structures 104, as further described herein. At least one of the first and second opposing electrodes 101, 102 can formed with the plurality of recoverably-deformable structures 104 as a film, as further described in connection with FIG. 2.

The respective plurality of recoverably-deformable structures 104 can include, based on the conductive-resistive elements 103-1, 103-2, 103-3, 103-4, 105-1, 105-2, 105-3, 105-4, at least one variable conductor and at least one variable resistor. A variable conductor refers to or includes an object with a variable degree to which the object conducts or resists electricity. In some context, a variable conductor refers to an object with a variable degree to which the object resists electricity.

Each electronic force sensor can include of one or more recoverably-deformable structures 104. The plurality of recoverably-deformable structures 104 have various attributes that set a force sensitivity of the electronic force sensor 100. The attributes includes shape and material composition attributes. Example shape attributes include the shape or size of the recoverably-deformable structure, such as pyramid, a pillar, a square, a column, and/or a hexagon column. The structures may be connected or discrete structures. Example sizes and/or dimensions of the recoverably-deformable structures 104 include dimensions of a range of between tens of microns (e.g., 10-80 um) and tens of millimeters (e.g., 10-80 mm). In specific examples, the structures can have dimensions of less than 5 um (e.g., between 1 um and 5 um) and in other examples the structures can have dimensions of greater than 200 um (e.g., between 200 um and 10 mm). The size/dimensions of a recoverably-deformable structure can refer to the width, length, height. Although embodiments are not so limited and the dimensions can refer to a cross-section, diameter, over-all volume, and/or various combinations thereof and can be changed or tuned for different implementations (as further discussed herein). The structure-to-structure center-to-center distance can be a range of between tens of nanometers (e.g., 10-80 nm) to tens of millimeters (e.g., 10-80 mm), and the distance may have a broad range within one electronic force sensor. The material composition attributes can include a location and/or amount of conductive material and/or non-conductive material (or resistive material), as further described herein. Further, the plurality of recoverably-deformable structures 104 can be formed of a non-conductive material and/or the same material as the second and/or first opposing electrodes 101, 102.

In various specific embodiments, when force is applied to one of the first and/or second opposing electrodes 101, 102, the distance between the first and/or second opposing electrodes 101, 102 can change and/or the orientation of the recoverably-deformable structures 104 can adjust. Responsive to the force, a capacitance or resistance of electronic force sensor 100 changes. This change can be sensed by circuitry, such as the sensor circuitry 106.

As previously discussed, the conductive-resistive elements 103-1, 103-2, 103-3, 103-4, 105-1, 105-2, 105-3, 105-4 can include at least one conductive portion 105-1, 105-2, 105-3, 105-4 and at least one resistive (or non-conductive) portion 103-1, 103-2, 103-3, 103-4. The conductive portions 105-1, 105-2, 105-3, 105-4 and resistive portions 103-1, 103-2, 103-3, 103-4 include conductive material and non-conductive material, respectively. The location, amount, and/or type of the conductive material and non-conductive material can include attributes that set the force sensitivity and threshold. In various embodiments, the conductive portion (e.g., conductive portions 105-1, 105-2) is located at a base or proximal to the second opposing electrode 102 and the resistive portion (e.g., non-conductive portions 103-1, 103-2) is located at a top or proximal to the first opposing electrode 101. The first and second recoverably-deformable structures 104-1, 104-2 illustrated by FIG. 1A have conductive portions at the base and resistive portions at the top of the respective recoverably deformable structures. Such recoverably-deformable structures can provide a resistive value when no force is applied and/or when a force is applied that is below the threshold resistance of switching range that is set by the recoverably-deformable structures. As illustrated, the shapes of the recoverably-deformable structure 104 can include different shapes, such as pyramids (e.g., 104-2) and/or flat-topped pyramids (e.g., 104-1). In various specific embodiments, the shapes of the recoverably-deformable structures 104 in a single electronic force sensor 100 can include the same shape or different shapes and/or the same shapes with the same conductive-resistive elements or different conductive-resistive elements.

In related-embodiments, the conductive-resistive elements include a resistive portion that is proximal to the first opposing electrode and that includes a non-conductive material and/or does not include, or is not covered in a conductive material (e.g., as illustrated by 104-1, 104-2, 104-4). Further, the conductive-resistive elements can include conductive portions that are proximal to the second opposing electrode 102 and that includes a conductive material and/or is a non-conductive material covered in a conductive material.

In various embodiments, the non-conductive material can include silicon elastomer, Polydimethylsiloxane (PDMS), crosslinked perfluoropolyether (PFPE), polyurathene, polystyrene-polybutyldiene-polystyrene, and/or fluorinated elastomers such as poly(vinylidene fluoride-hexafluoropropylene) (PVDF-HFP), among other non-conductive material. The conductive material can include carbon, carbon nanotubes, graphene, nanowires, metal, conducting polymer, and/or other conductive material.

Other related embodiments include conductive-resistive elements that include a conductive portion (e.g., 105-3) located on at least one side portion of at least one recoverably-deformable structures (e.g., 104-3). The conductive portions includes a conductive material and/or is a non-conductive material covered in a conductive material. Further, other side portions of the recoverably-deformable structures can be resistive portions (e.g., 103-3) that include a non-conductive material and/or does not include or is not covered in a conductive material. In various embodiments, multiples sides of the recoverably-deformable structures include conductive portions (or resistive portions) that have different concentrations of conductive material and/or differently conductive material. For example, the recoverably deformable structure can provide different resistively and/or conductively in response to the same amount of force applied in different directions. The sensor circuitry 106 can differentiate between different stimuli based on the different resistivity and/or conductivity based on output(s) by the electronic force sensor 100.

In other embodiments, the conductive-resistive elements include at least one resistive portion and at least one conductive portion (relative to one another) that are within the recoverably-deformable structures (e.g., structure 104-4). For example, a conductive material and non-conductive material can form the recoverably-deformable structures. The conductive and/or non-conductive materials can be arranged within the recoverably-deformable structures as a ratio of conductive material to non-conductive material. For example, the ratio of conductive material to non-conductive material is higher in a conductive portion (e.g., conductive portion 105-4) than the ratio is in a resistive portion (e.g., resistive portions 103-4). The ratio may be higher proximal to the second opposing electrode 102 as compared to the first opposing electrode 101, or vice versa, to provide high resistivity or capacity when no force is applied. Further, in some embodiments, the conductive material is arranged within the recoverably-deformable structures in multiple layers.

The recoverably-deformable structures 104 can set a threshold resistance of switching range for the electronic force sensor 100. A threshold resistance of switching range can refer to or include a point (e.g., force) of the resistance of the electronic force sensor in which the resistance (or capacitance) begins to drop dramatically. The location and/or amount of non-conductive material (and/or the resistive portion) can set the threshold resistance of switching range. The recoverably-deformable structures 104 can provide a higher resistivity (or capacity) in response to no force or low force applied than a resistivity (or capacity) provided in response to a greater force applied (or a force greater than the threshold resistivity of switching). The threshold resistance of switching can be in a range of 1E10/1E1 Ohms for a force range of 0-400 kPa in various implementations and in other implementations for a force range of 0-400 MPa (e.g., a pressure range).

In response to no force applied and/or a force applied that is less than the threshold resistance of switching range, the electronic force sensor 100 can provide a resistive value and/or may not consume electrical power. In such embodiments, when no force is applied, the electronic force sensor 100 does not consume power, which can preserve battery and result in greater battery life. In various embodiments, battery replacement may be beneficial to avoid, such as when the sensor is in a remote location and/or invasively placed within a live body (e.g., human, animal, or otherwise). The resistance can be above hundreds of kOhms when no force is applied. Further, the resistivity of the electronic force sensor 100 can be reduced, by orders of magnitude, in response to an applied force and until the threshold resistance of switching range is reached (in which the electronic force sensor 100 may become capacitive). Although the above describes the threshold resistance of switching range as relating to the point at which the electronic force sensor 100 becomes capacitive, embodiments are not so limited. For example, in various embodiments, the electronic force sensor 100 is capacitive when no force is applied and in response to a force applied that reaches or exceeds the threshold resistance of switching range, the electronic force sensor 100 becomes resistive. For example, the resistive value is output by the electronic force sensor 100 and detected by the sensor circuitry 106.

The sensor circuitry 106 detects the output from the electronic force sensor 100 and outputs an electronic signal indicative of the amount of force applied. For example, the sensor circuitry 106 detects a capacitive or resistive value and based on the value outputs a signal indicative of the amount of force applied. The sensor circuitry 106 can include force sensor circuitry. The force sensor circuitry determines an amount of force applied to the electronic force sensor based on a change of the resistivity or capacity of the electronic force sensor 100. For example, in response to the force applied reaching or exceeding the threshold of resistance switching range, the electronic force sensor 100 outputs a capacitance (or a resistance) value to the force sensor circuitry.

In various embodiments, the sensor circuitry 106 further includes electrochromic device circuitry. For example, the electronic force sensor 100 can include a polymer layer that is arranged with the sensor circuitry 106 to change the physical color of the electronic force sensor 100. The color can change based on and/or in response to the amount of force applied, as further described herein. The color change can include different colors and/or different intensities of one or more colors that is indicative of an amount of force applied.

Although the embodiment of FIG. 1A illustrates structures of a similar shape and with different conductive-resistive elements, embodiments are not so limited. For example, the structures can include different shapes than illustrated by FIG. 1A. Example shapes include 4-sided pyramids, three-sided pyramids, cones, cubes, prisms, rectangular prisms, spheres, half-spheres, cylinders, frustums, polyhedron, and irregular polyhedrons, among other shapes. Further, each structure can include the same conductive-resistive elements or different. For example, each of the structures can be the same. In other embodiments, the structures can be different. For example, different sections of the electronic force sensor 100 can include different types of recoverably-deformable structures to respond to different events (e.g., different sets of recoverably-deformable structures). As a specific example, an electronic force sensor 100 can include three different sections with the first section including a plurality of a first type of recoverably-deformable structures (e.g., a first subset), the second section including a plurality of a second type of recoverably-deformable structures (e.g., a second subset), and the third section including a plurality of a third type of recoverably-deformable structures (e.g., a third subset). The three different types of recoverably-deformable structures can have different threshold resistance of switching and/or different placements of the resistive-conductive elements.

Figure 1B:
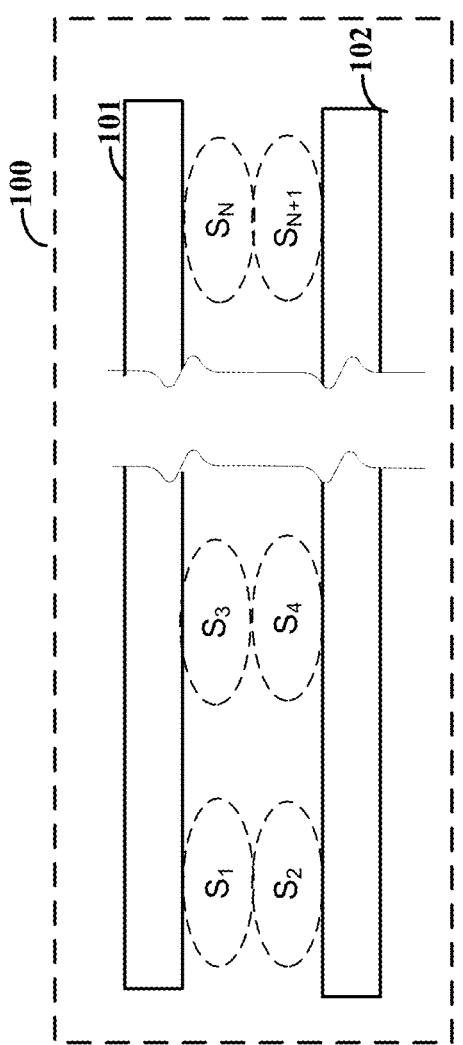

FIG. 1B illustrates an example of an electronic force sensor 100 in accordance with various embodiments. As illustrated, the electronic force sensor 100 includes a plurality of recoverably-deformable structures with resistive-conductive elements (e.g., $S_1$, $S_2$, $S_3$, $S_4$, $S_N$, $S_{N+1}$) located between two opposing electrodes 101, 102. As described above, the recoverable-deformable structures with resistive-conductive elements can be a variety of different shapes. Further, the resistive-conductive elements can be separate parts of the recoverably-deformable structures that are formed of different materials and/or can be formed integrally together and using at least one conductive material and one resistive material.

Figure 1C:
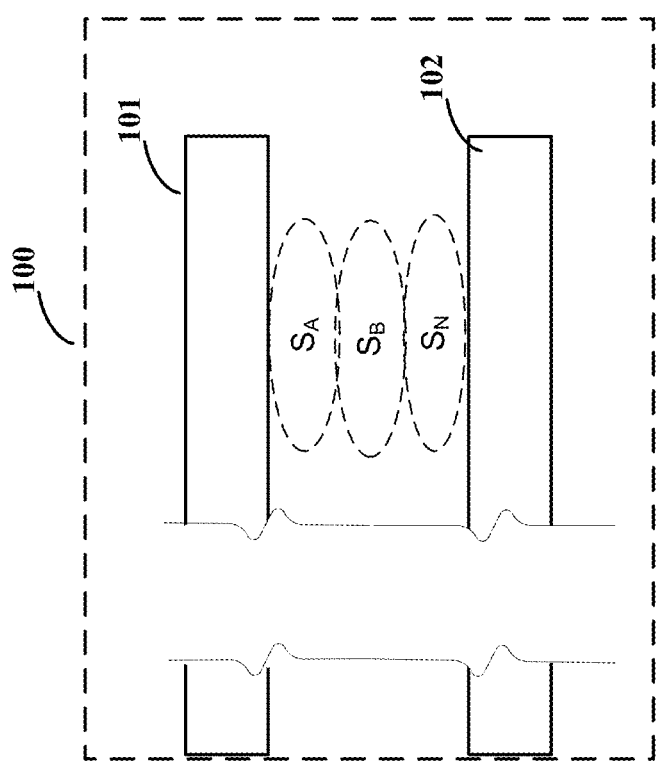

FIG. 1C illustrates an example of an electronic force sensor 100 in accordance with various embodiments. Specifically, FIG. 1C illustrates a subsection of an electronic force sensor 100. In various embodiments, the plurality of recoverably-deformable structures that are located between the two opposing electrodes 101, 102 are not limited to resistive-conductive elements formed of a resistive portion and a conductive portions. For example, as illustrated by FIG. 1C, the resistive-conductive elements of one or more of the plurality of recoverably-deformable structures include three or more portions $S_A$, $S_B$, $S_N$. The three (or more) portions $S_A$, $S_B$, $S_N$ can include two resistive portions and one conductive portions, one conductive portion and two resistive portions, and/or portions with different ratios of conductive material to resistive material. As a specific example, the first portion $S_A$ can include a first resistive portion having a first resistivity, the second portion $S_B$ can include a second resistive portion having a second resistivity that is lower than the first resistivity, and the third portion $S_N$ can include a conductive portion having a conductive value and/or material. The three portions $S_A$, $S_B$, $S_N$ can be formed of the same or different material and/or include different amounts of conductive material and/or resistive material.

Figure 2:
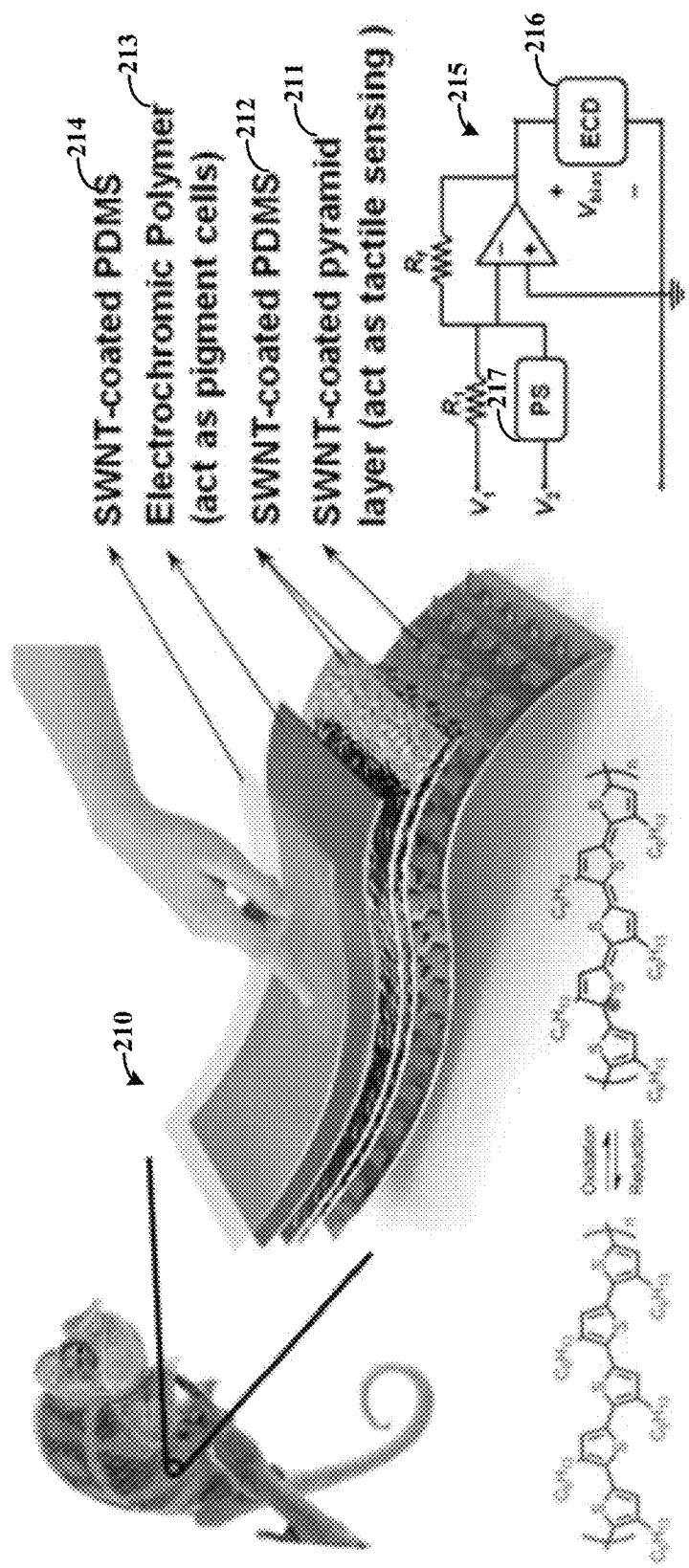
FIG. 2 illustrates an example of an apparatus in accordance with various embodiments.

FIG. 2 illustrates an example of an apparatus in accordance with various embodiments. An apparatus can include an electronic force sensor 210 (as an example detailed/experimental pressure sensor embodiment) and sensor circuitry 215, consistent with various aspects of the present disclosure. The illustrated exemplary electronic force sensor 210 includes layered materials 211, 212, 213, 214 (shown from a perspective view) and sensor circuitry 215 (shown schematically) as being integrated and configured to generate an output indicative of a force (e.g., pressure) applied to the electronic force sensor 210.

In some specific embodiments, the electronic force sensor 210 includes a plurality of layered materials. The layered materials can include a single-walled carbon-nanotube (SWNT)-coated Polydimethylsiloxane (PDMS) layer 214, an electrochromic polymer layer 213 which acts as pigment cells, another SWNT-coated PDMS layer(s) 212, and a SWNT-coated PDMS pyramid layer 211 which forms an integrated array/set of sensors for tactile sensing. The pyramid layer forms part of the circuitry including a plurality of recoverably-deformable structures (e.g., pyramid-shaped structures) that are partially covered in a conductive material (e.g., SWNT).

The sensor circuitry 215 can include a force sensor circuitry 217 and, optionally, an electrochromic device circuitry 216. The force sensor circuitry 217 determines an amount of force applied to the electronic force sensor 210 based on a change of the resistivity of the electronic force sensor 210. For example, in response to the force applied reaching or exceeding the threshold of resistance switching range, the electronic force sensor 210 outputs a capacitance (or a resistance) value to the force sensor circuitry 217. Both the force sensor circuitry 217 and electrochromic device circuitry (ECD) 216 are shown schematically within the sensor circuitry 215.

An ECD as used herein includes or refers to circuitry that controls optical properties, such as optical transmission, absorption, reflectance, and/or emittance, in a continual and reversible manner based on application of a voltage. ECDs can include electrochromic cells. Two electrochromic cells layers can be separated by an electrolytic layer and with conducting electrodes on the other side of each electrochromic cells layer. An ECD can function based on a voltage, for which the conductive electrodes are used on each side of the electrochromic cells layers. The electrolytic layers separates the two electrochromic cells layers and is an ion conductor. Optical absorption occurs when electrons move into the electrochromic cells layers from the conductors along with charge balancing ions entering from the electrolyte layer. For more information on ECDs, reference is made to Paul Monk et al., *Applications of electrochromic devices. In: Electrochromism and Electrochromic Devices*, pp. 395-416 (2007), Cambridge: Cambridge University Press, available from: Cambridge Books Online, http://dx.doi.org/10.1017/CBO9780511550959.015, which is hereby fully incorporated for its general and specific teachings with respect to ECDs and applications.

In response to force being applied (as depicted by the human skin touch atop of the upper SWNT-coated PDMS layer), the sensor circuitry 215 responds to a change of a resistivity which is output from the electronic force sensor 210. While not illustrated therein, the sensor circuitry 215 can also be configured and arranged to respond to tactile or other stimuli by sending a signal that causes the electrochromic polymer layer 213 to change color (e.g., due to a change in applied potential across the electrochromic polymer layer 213) which can also be used and (visually) recognized as an output signal from the electronic force sensor 210, for example, with or without outer layers being transparent or semi-transparent. Accordingly, the sensor circuitry 215 can respond to the electronic force sensor 210 by detecting an amount of force applied to the electronic force sensor 210 and/or changing a physical color of (at least part of) the electronic force sensor 210 based on an amount of applied force.

In some specific embodiments, a first voltage (V1) is applied across the force sensor circuitry 217 and/or electrochromic device circuitry 216. For example, the force sensor circuitry 217 and/or electrochromic device circuitry 216 are biased with the first voltage (V1). A second voltage (V2) is applied responsive to an output from the electronic force sensor 210 and detected by the sensor circuitry 215 via the force sensor circuitry 217. The force sensor circuitry 217, for example, detects the second voltage (V2) and outputs an electrical signal indicative of the amount of force applied. Further, the second voltage is detected, in some embodiments, by the electrochromic device circuitry 216. For example, the output from the force sensor circuitry 217 can be input to the electrochromic device circuitry 216, although embodiments are not so limited and the specific illustration of sensor circuitry 215 is for illustrative purposes only.

Figure 3:
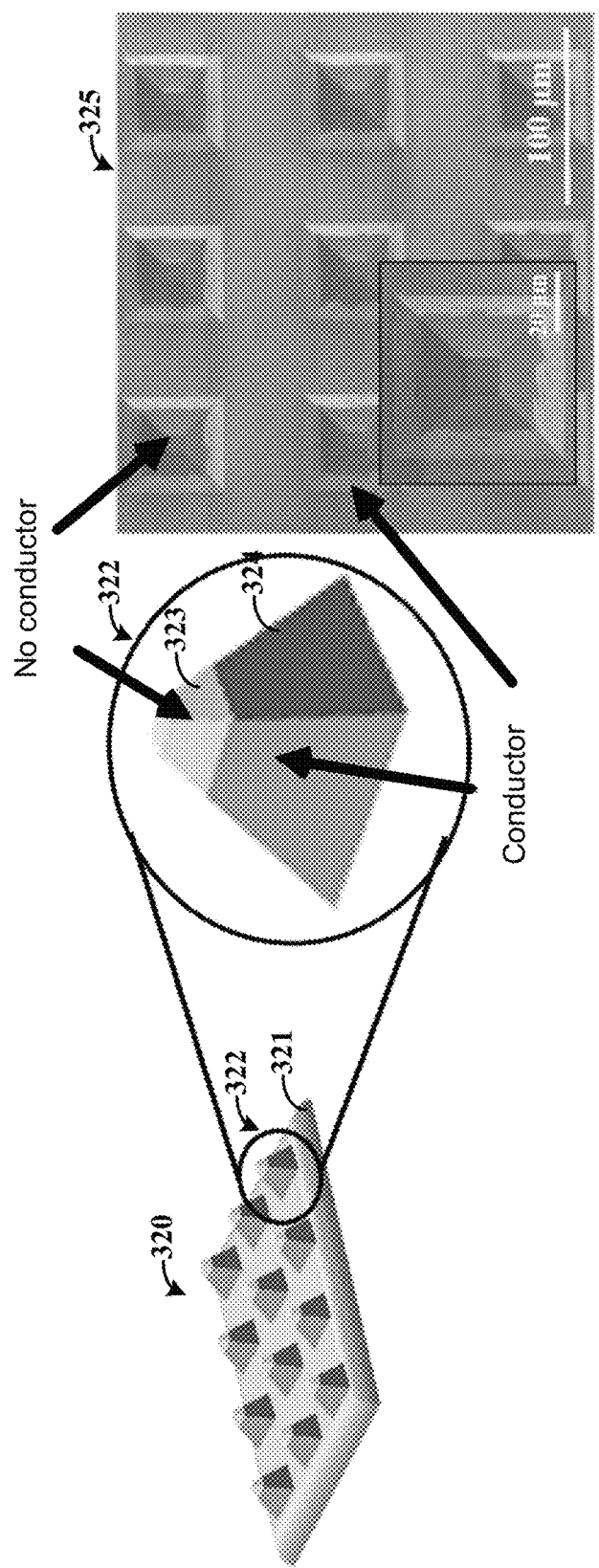
FIG. 3 illustrates an example of a plurality of recoverably-deformable structures of an electronic force sensor in accordance with various embodiments.

FIG. 3 illustrates an example of a plurality of recoverably-deformable structures of an electronic force sensor in accordance with various embodiments. The electronic force sensor includes an elastic film/an opposing electrode 321 (e.g., a base or bottom electrode) that includes a plurality of recoverably-deformable structures. For example, the plurality of recoverably-deformable structures protrude from a surface of the opposing electrode 321 that form a film. The plurality of recoverably-deformable structures, as exemplified by recoverably-deformable structure 322, include at least one resistive portion 323 and at least one conductive portion 324. In some instances, the recoverably-deformable structures can be fabricated of SWNT-coated PDMS structures, the top portion having the SWNTs removed or covered with a resistive material to create the resistive portion 323. The rightmost figure depicts a top view of the plurality of recoverably-deformable structures 325 with the opposing electrode 321 beneath. In this specific embodiment, the resistive portion 323 is the top of the recoverably-deformable structure and is used to set a threshold switching range in response to a force applied perpendicular to the opposing electrode 321. In various embodiments, the resistive material can be the majority of the recoverably-deformable structures and acts as a base (e.g., the conductive portion 324 is formed of the resistive material and coated with or filled with a conductive material), although embodiments are not so limited and various embodiments include the reverse.

Figure 4A:
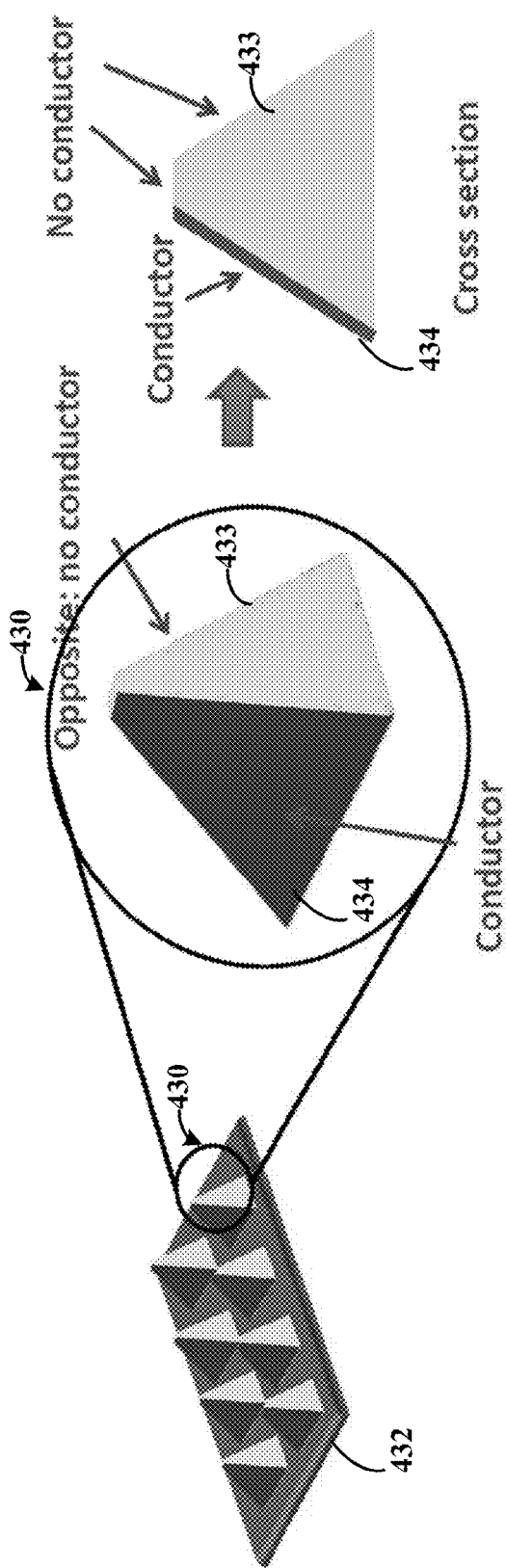
FIGS. 4A-4B illustrate an example of a plurality of recoverably-deformable structures of an electronic force sensor, in accordance with various embodiments.
Figure 4B:
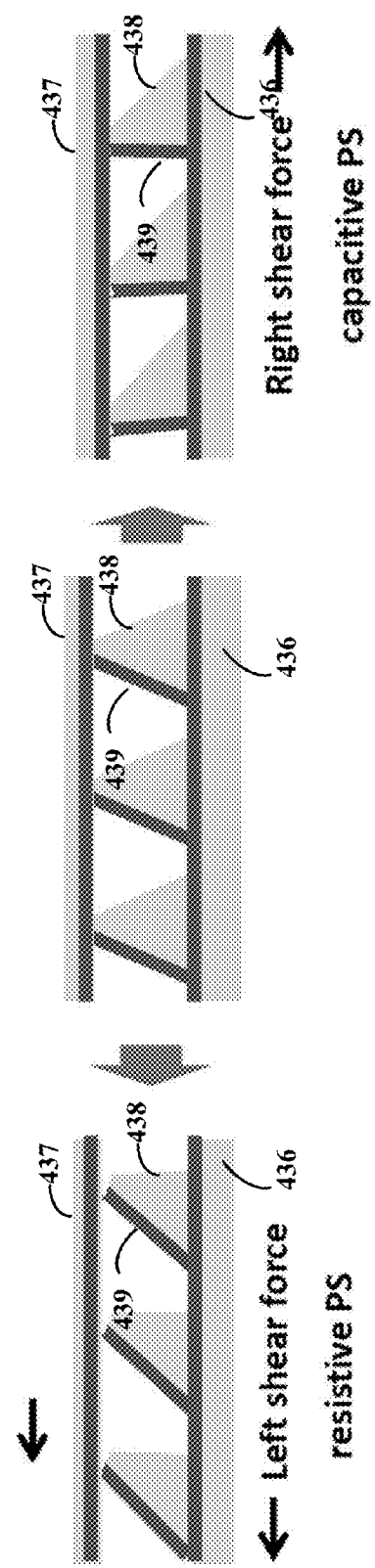

FIGS. 4A-4B illustrate an example of a plurality of recoverably-deformable structures of an electronic force sensor, in accordance with various embodiments. As illustrated by FIG. 4A in various embodiments, the recoverably-deformable structures are formed on and/or with an opposing electrode 432. For example, one of the plurality of recoverably-deformable structures 430 is illustrated in a larger view. As illustrated, a resistive portion 433 can include a majority of the recoverably-deformable structure and can act as a base. The conductive portion 434 can include at least one side portion of the recoverably-deformable structure 430 and that includes or is covered in a conductive material, as further illustrated by the cross-section view of the recoverably-deformable structure 430.

In various embodiments, the resistive portion can be where the conductive portion is in FIG. 4A, as illustrated by FIG. 4B, where the conductive portion is shown on one side to sense forces moving to the right. FIG. 4B shows how various forces, such as shear force, affect the force sensor. As illustrated, the plurality of recoverably-deformable structures can include a resistive portion 439 and a conductive portion 438. For example, as illustrated on the left side of FIG. 4B, in response to left shear forces (or forces to the left), the electronic force sensor is resistive as the first and second opposing electrodes 437, 436 are connected to one another by resistive portions 439 of the plurality of recoverably-deformable structures. As illustrated by the middle of FIG. 4B, when no shear forces (or forces left or right) are applied, the electronic force sensor may be resistive (but at a lower value then when the left force or shear force is applied) or may be conductive as the first and second opposing electrodes 437, 436 are connected to one another by at least portions of conductive portions 438 and at least portions of the resistive portions 439 of the plurality of recoverably-deformable structures. As illustrated by the right side of FIG. 4B, in response to right shear forces (or forces to the right), the electronic force sensor is capacitive (but at a higher value than when no shear forces or forces are applied), as the first and second opposing electrodes 437, 436 are connected to one another by at least a part of conductive portions 438 (and/or connected to less of the resistive portions 439 of the plurality of recoverably-deformable structures than when no forces are applied).

Figure 5:
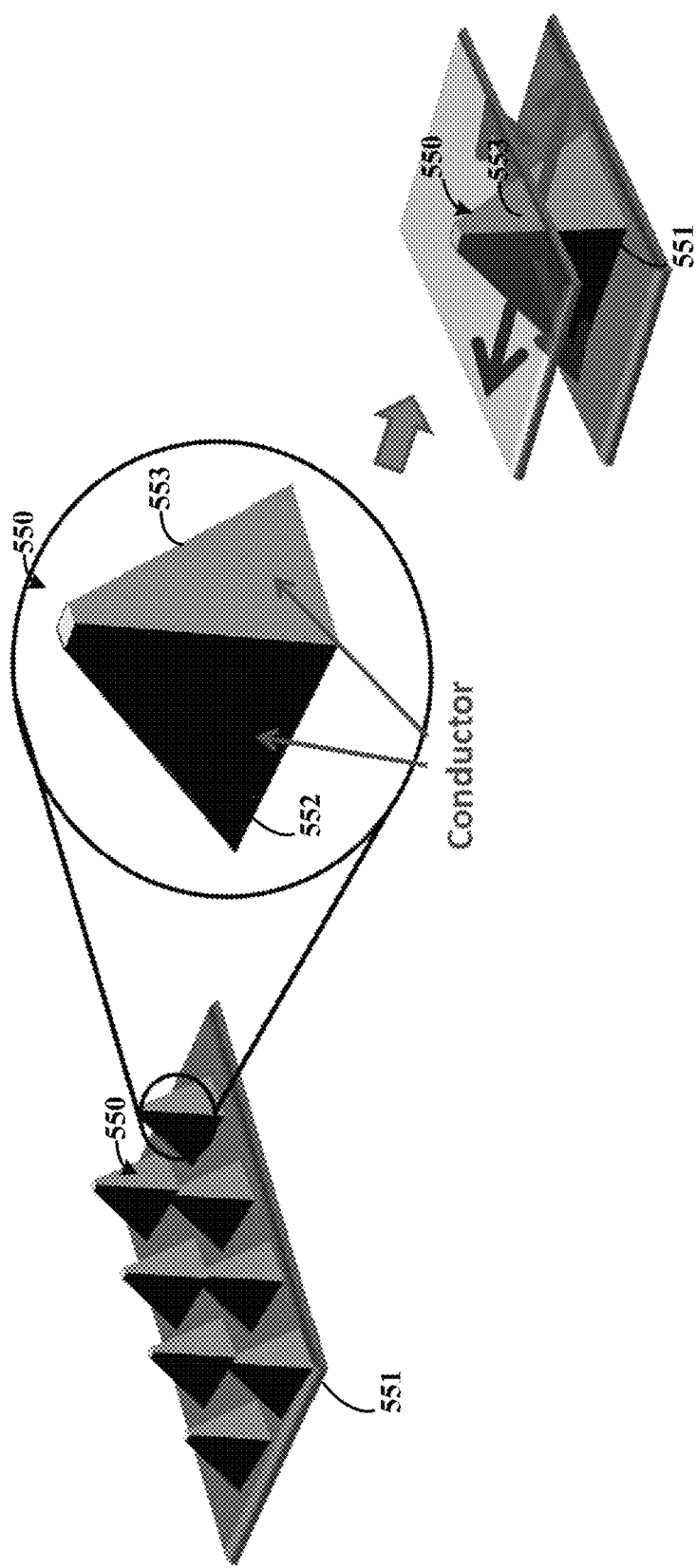
FIG. 5 illustrates an example of a plurality of recoverably-deformable structures of an electronic force sensor in accordance with various embodiments.

FIG. 5 illustrates an example of a plurality of recoverably-deformable structures of an electronic force sensor in accordance with various embodiments. Some embodiments involve different conductive materials, different amounts of conductive materials and different placement/arrangement of conductive materials (seen in FIGS. 3 and 4A). For example, as illustrated by FIG. 5, a conductive material is located on each side of the structure, allowing the electronic force sensor to output different responses to movement in two or more directions (e.g., axes). The plurality of recoverably-deformable structures can be formed with or on an opposing electrode 551. One of the plurality of recoverably-deformable structures 550 is illustrated as a larger version and illustrates the structures have a resistive portion (e.g. the base of the structure) and multiple conductive portions 552, 553. The multiple conductive portions 552, 553 have different conductivities in response to a same amount of force applied in different directions. In various embodiments, each side of one or more of the recoverably-deformable structures are coated in or include conductive materials with different conductivities, with respect to one another, in response to the same amount of force applied in different directions.

Other embodiments include varying the type of conductive material in order to achieve various resistance ranges, for example, the conductive portion on one side of the structures may have a smaller resistance value than that of another side, which is more likely to interact with smaller forces. Various types of this embodiment can be used in sensing wind or fluid flow.

Figure 6A:
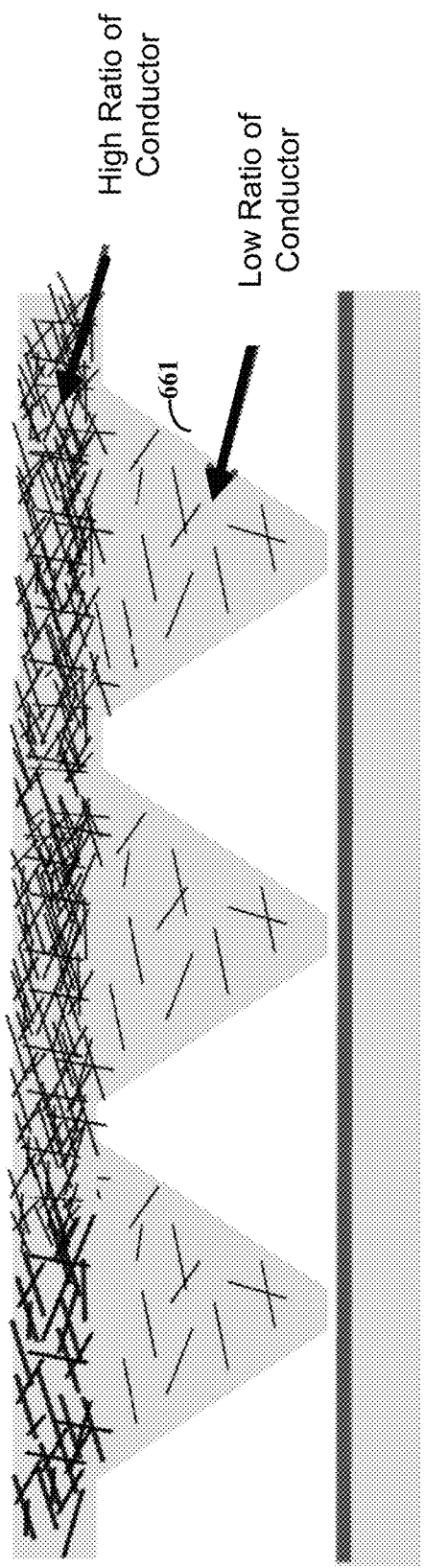
FIGS. 6A-6D illustrate examples of a plurality of recoverably-deformable structures of an electronic force sensor in accordance with various embodiments.

FIGS. 6A-6D illustrate examples of a plurality of recoverably-deformable structures of an electronic force sensor in accordance with various embodiments. In some embodiments, as illustrated by FIGS. 6A-D, the recoverably-deformable structures include different ratios of conductive material to non-conductive material relative to a position on or within the structure. FIG. 6A illustrates recoverably-deformable structures 661 with no distinct resistive portion and conductive portion, but rather a portion with a low ratio of conductive material (e.g., the resistive portion) and a portion with a high ratio of conductive material (e.g., the conductive portion). Such embodiments can be used to sense a force even if the force has not reached a certain level, or broken a specific threshold. If the force is large enough to interact with the portion with a high ratio of conductive material, the electronic force sensor reacts differently.

Figure 6B:
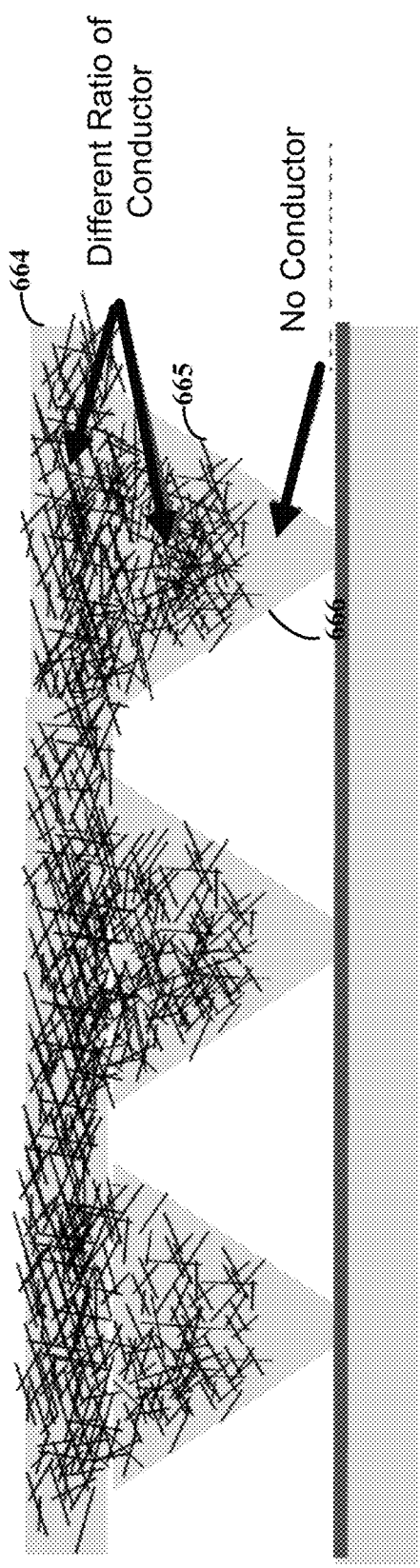

FIG. 6B illustrates example embodiments in which the recoverably-deformable structures have both a distinctly resistive portion 666 and two different ratio-based conductive portions 664, 665. This design, applicable in multiple embodiments, can allow for the force sensor to act as a buffer as in FIG. 3 and retain the incremental conductance as seen in FIG. 6A.

Figure 6C:
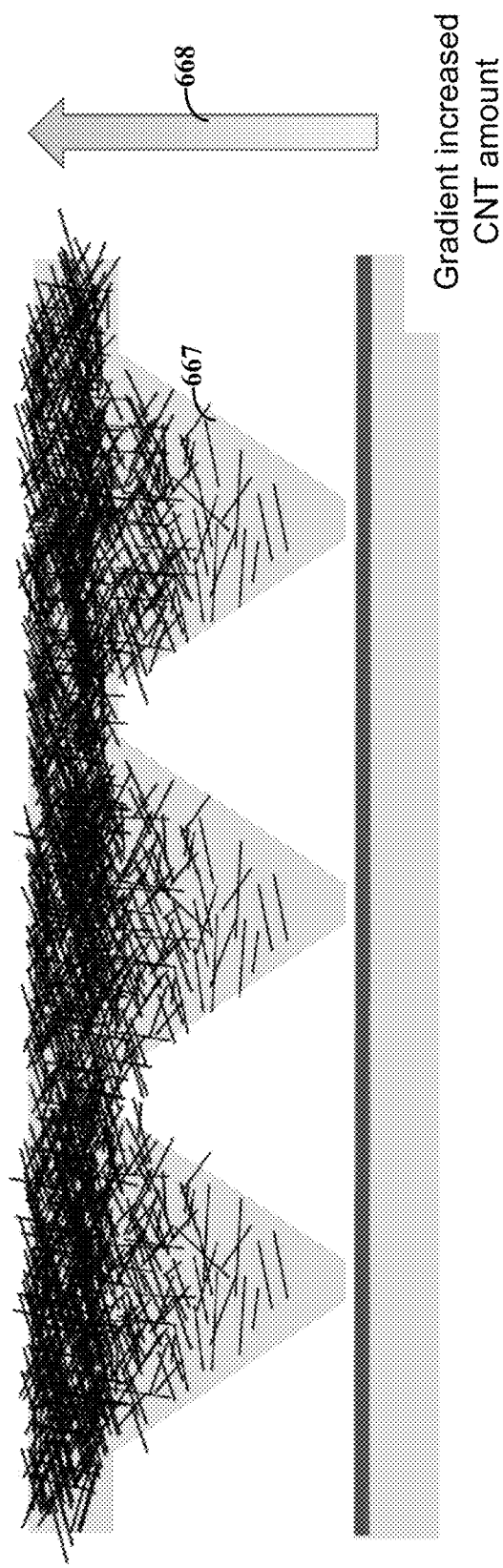

FIG. 6C illustrates example embodiments in which the recoverably-deformable structures 667 have a gradual increase in the presence of conductive material (e.g., SWNT presence) which can result in the electronic force sensor having an equally gradual reaction to a force applied. For example, the gradual increase includes an increase in the ratio of conductive material to non-conductive material in the direction of the arrow 668 illustrated by FIG. 6C.

Figure 6D:
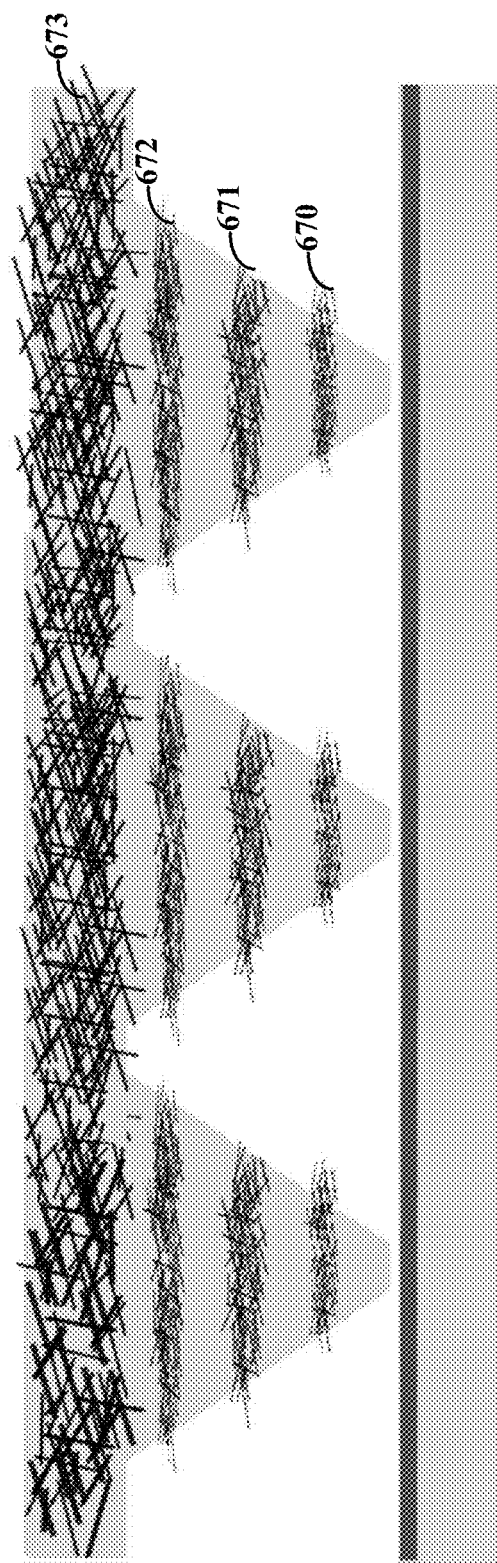

FIG. 6D illustrates example embodiments in which the recoverably-deformable structures have conductive material placed in increments throughout the height of the structure and in layers 670, 671 672, 673. Such embodiments can result in the electronic force sensor having distinct reactions as each level of conductance is reached. For example, sensor circuitry can respond to a plurality of events based on the different levels of conductance.

Figure 7A:
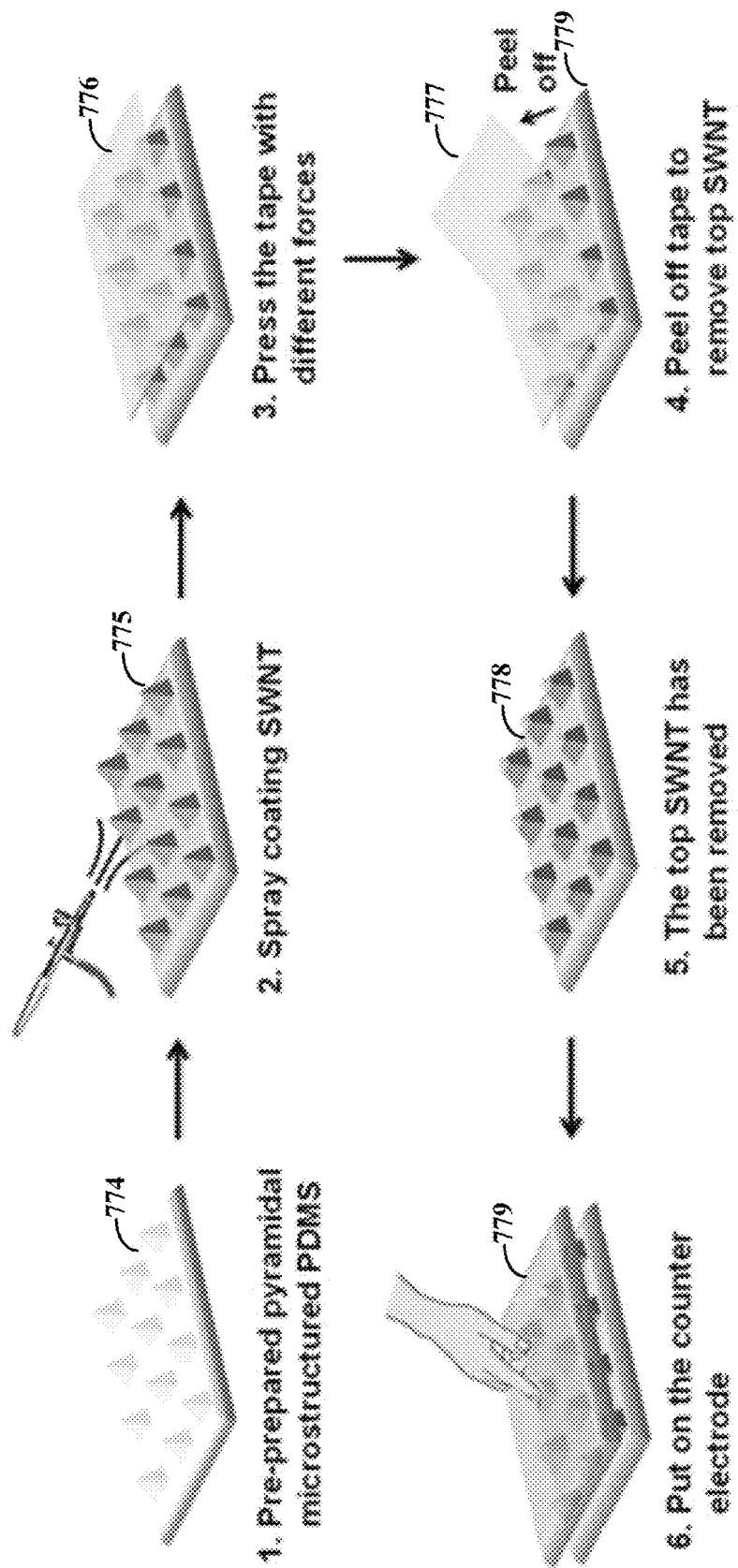
FIG. 7A illustrates an example process of forming a plurality of recoverably-deformable structures of an electronic force sensor, in accordance with various embodiments.

FIG. 7A illustrates an example process of forming a plurality of recoverably-deformable structures of an electronic force sensor, in accordance with various embodiments.

In various example processes, at 774, a non-conductive material is used to form a film including an opposing electrode with a plurality of recoverably-deformable structures. The opposing electrode and recoverably-deformable structures can be formed of PDMS surface. In a specific experimental embodiment, said pyramidal structured PDMS is 34 µm in height, 10×10 µm² for the top, 50×50 µm² for the base, and 41 µm periodic spacing. The top of the recoverably-deformable structures, as used herein, can include the initial contact surface. The top of pyramids (e.g., 10×10 µm²) are covered by a conductive material, such as SWNTs, at 775. Covering in SWNTs can include spraying a layer of SWNT (e.g., uniformly spray-coated) on top of a pyramidal structured PDMS surface. A kapton tape, at 776, can then be used to remove the SWNT from the top of the pyramid by placing the tape on the pyramids and at 777, the tape is removed. Removing the tape, as illustrated at 778, removes the SWNT from the top of the SWNTs, and can lead to low resistance when no force is applied to the electronic force sensor (and even after force is applied until a threshold resistance of switching is reached). Further, at 779, an opposing electrode composed of a layer of SWNTs on a flat surface of PDMS can be placed on the top of the SWNTs partially coated pyramids. Based on such a design, when no pressure is applied, the sensor is non-conductive and can prevent current flow due to the lack of SWNTs coating on the top of the pyramids. The electronic force sensor becomes conductive and the resistance drops with an applied force.

However, embodiments are not so limited and the electronic force sensor can be formed in a variety of ways. For example, forming the electronic force sensor can include curing a non-conductive material to form a film including an opposing electrode with a plurality of recoverably-deformable structures. The opposing electrode and structures can be formed of PDMS surface. The PDMS or other material can be cured in a mold that is an inverse of the intended opposing electrode and structures. A coating of a conductive material can be applied to the plurality of recoverably-deformable structures. In various embodiments, the conductive material is uniformly applied. In other embodiments, different types or amounts of conductive material is applied to different locations. Tape is applied to portions of structures to remove portions of the conductive material. For example, the portions of the recoverably-deformable structures in which the tape is applied (and/or an amount of pressure that is applied to the tape) forms the resistive portions (and consequently the conductive portions) by selectively removing conductive material. Further, the resistivity of the plurality of recoverably-deformable structures and/or a threshold of resistance switching range of the electronic force sensor is set based on an amount of conductive material used, a location of the conductive material on the recoverably-deformable structures, and/or a location or amount of conductive material that is removed by the tape. For example, a threshold of resistance switching range of the electronic force sensor can be tuned by applying a particular amount of the conductive material and/or by removing a particular portion of the conductive material using the tape.

In other related embodiments, forming the electronic force sensor can include curing a non-conductive material and a conductive material to form a film including an opposing electrode. The ratio of conductive to non-conductive material forming the opposing electrode can be high. The plurality of recoverably-deformable structures are formed by curing conductive and/or non-conductive material in multiple steps to form the plurality of recoverably-deformable structures extending from the opposing electrode. The different steps including different ratios of the conductive material to the non-conductive material through cross-sections of the plurality of recoverably-deformable structures. The resistivity of the plurality of recoverably-deformable structures and/or a threshold of resistance switching range of the electronic force sensor is set based on an amount of conductive material used and/or a location of the different ratios of conductive material to non-conductive material through cross-sections of the plurality of recoverably-deformable structures. For example, in some embodiments, the threshold of resistance switching range of the electronic force sensor can be tuned by curing a particular ratio of the conductive material to the non-conductive material at particular cross-sections of the plurality of recoverably-deformable structures.

FIGS. 7B-D illustrate examples of formed recoverably-deformable structures 780-1, 780-2, 780-3 using the process of FIG. 7A, in accordance with various embodiments. In accordance with a number of embodiments, the above-described approach is tailored for particular implementations to set the threshold resistance of switching based on the application of different pressures on the kapton tape to adjust the height of the SWNT on the pyramidal structured PDMS. FIGS. 7B-D illustrate that the larger the pressure applied on the tape (e.g., 1, 10, and 30 kPa), the less SWNTs remain on the pyramids. This can provide both the tunable resistance and tunable threshold of resistance switching range for the force sensor. Notably, pyramids with heights of 34 µm allow for a larger dynamic range for modulating the height of SWNTs on the pyramids. The size of the structures can be selected based on the sensor thickness, the dynamic range and/or sensitivity. Larger and thicker structures can be useful for detecting larger pressure ranges while respectively smaller and thinner structures can be useful for detecting lower pressure ranges. The sensitivity and dynamic range can also be selected based on the area of change in contact with one of the opposing electrodes 101 as a function of distance change between the opposing electrodes 101, 102. The more area change with the same distance change between the opposing electrodes 101 and 102 can result in more sensitive force sensors.

FIG. 7B illustrates the recoverably-deformable structures 780-1 after 1 kPa of pressure is applied to the tape (PS-1), FIG. 7C illustrates the recoverably-deformable structures 780-2 after 10 kPa of pressure is applied to the tape (PS-10), and FIG. 7D illustrates the recoverably-deformable structures 780-3 after 30 kPa of pressure is applied to the tape (PS-30). The darker region in each figure being the resistive portion (where the SWNTs have been removed) and the lighter region being the SWNT-covered, or conductive portion.

More Specific/Experimental Embodiments

Figure 8A:
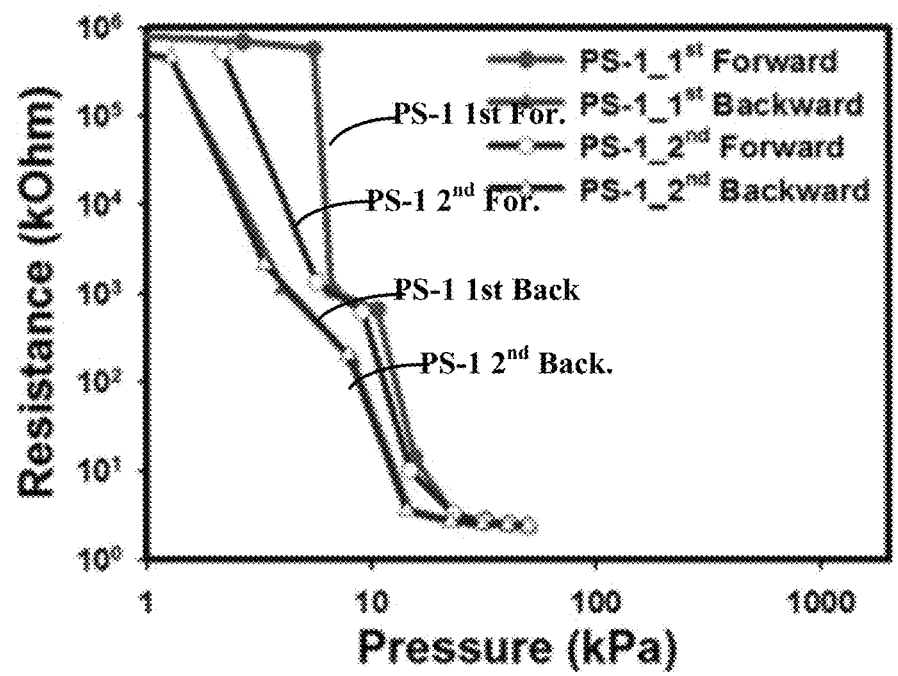
FIGS. 8A-8F illustrate example properties of electronic force sensors, in accordance with various embodiments.
Figure 8B:
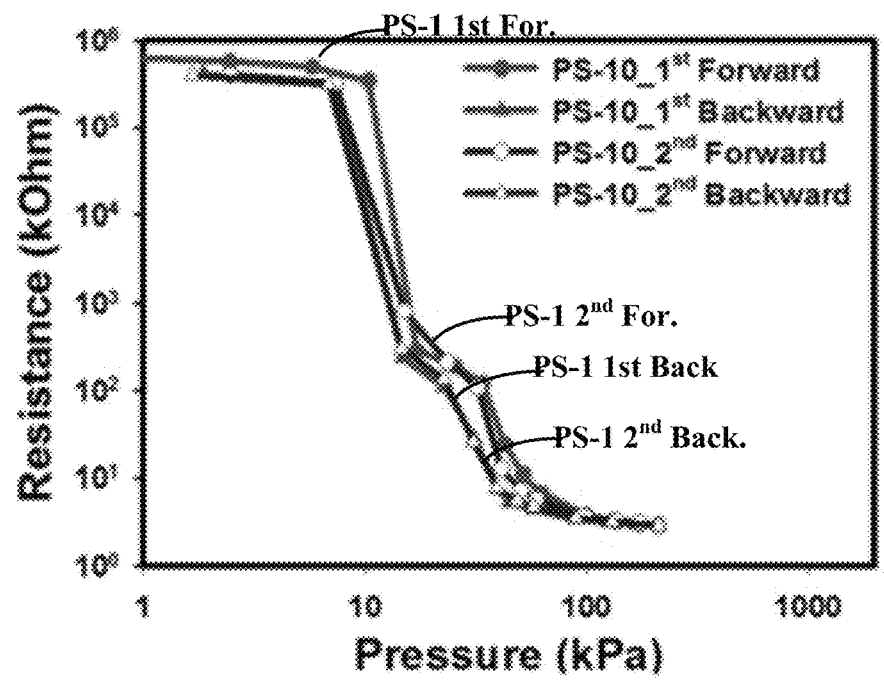
Figure 8C:
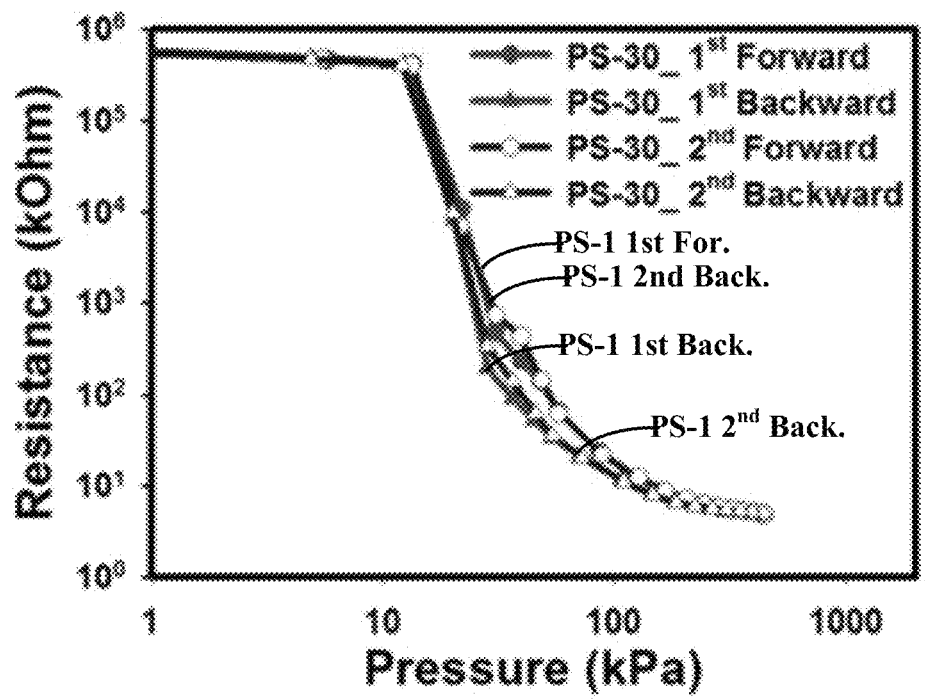

FIGS. 8A-8F illustrate example properties of electronic force sensors, in accordance with various embodiments. FIGS. 8A-C show the force response for four consecutive measurements of the pyramidal structured PDMS corresponding to PS-1, PS-10, PS-30, respectively. The resulting square force-sensitive pad can be 1 cm² in size. Slightly higher resistances can be observed with PS-1 and PS-10 for the first cycle, the subsequent cycles can be reproduced. PS-1 can show the lowest resistance at the same applied force, due to the higher coverage of SWNTs for PS-1. The force sensors PS-1, PS-10, and PS-30 can exhibit changes in resistance of up to five orders of magnitude by applying forces between 0 to 20 kPa, 0 to 50 kPa, and 0 to 1 kPa, respectively.

Figure 8D:
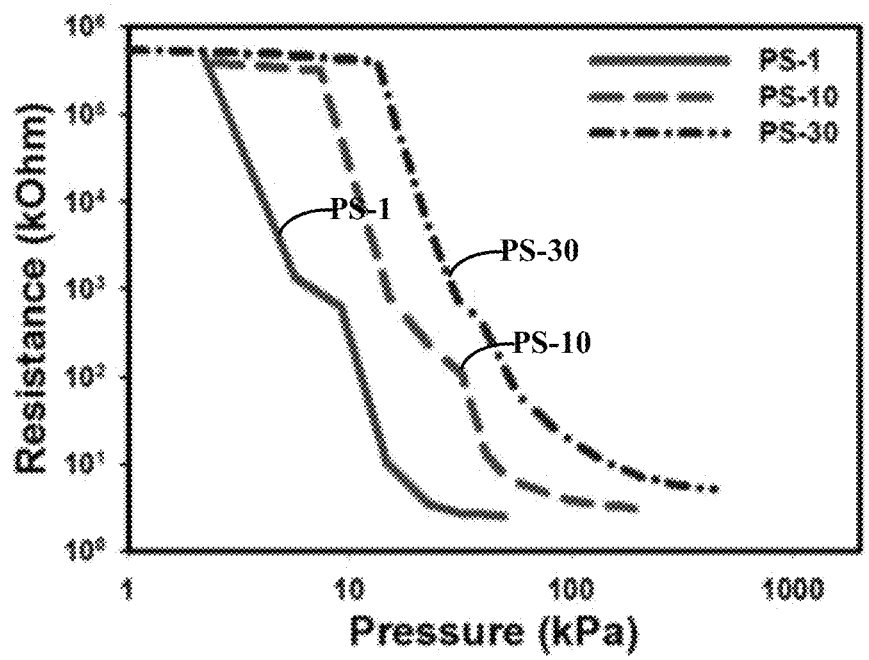

FIG. 8D illustrates that the height of the SWNTs can be related to the threshold of the resistance switching range, which is defined as the point of the resistance of the electronic force sensor in which the resistance begins to drop dramatically. In specific example embodiments, the threshold of the resistance switching range of PS-1, PS-10, and PS-30 can gradually increase as a function of the height of the conductive material (e.g., SWNT), showing onset detection of forces at 2.2, 7.4, and 13.3 kPa, respectively (second forward). Both the resistance range and the threshold of resistance switching range are tunable through modifying the height of the SWNTs structures. In certain embodiments, the target pressure range can be equivalent to human touch. Normal grip forces to hold objects are in the range of several kPa to several hundred kPa. The force applied during a handshake is in the order of several tens of kPa. Therefore, the tunable design of such force sensors can be useful for a variety of human interactive applications.

Figure 8E:
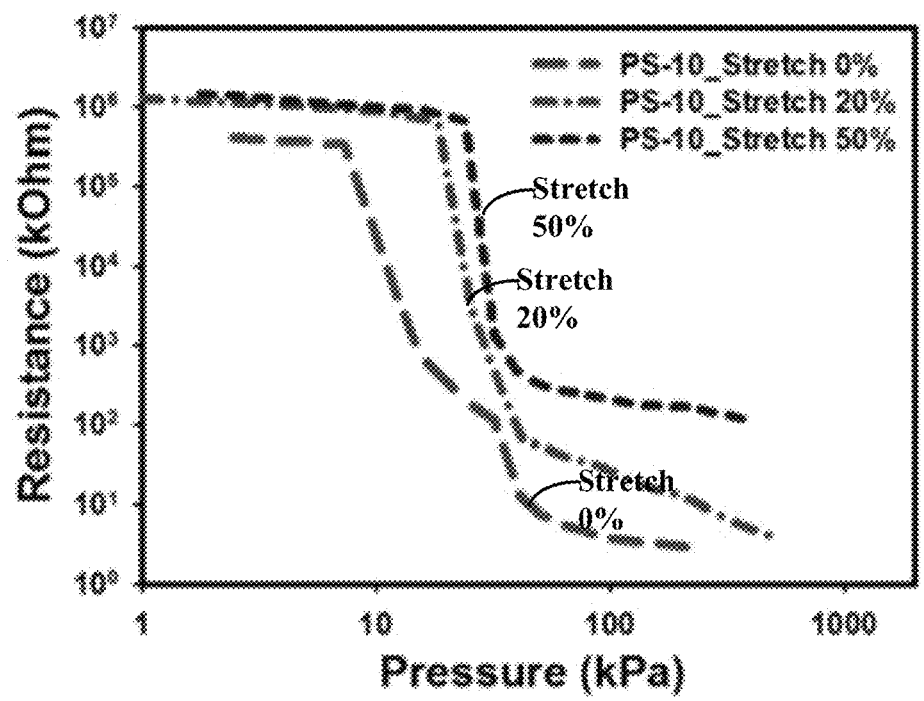
Figure 8F:
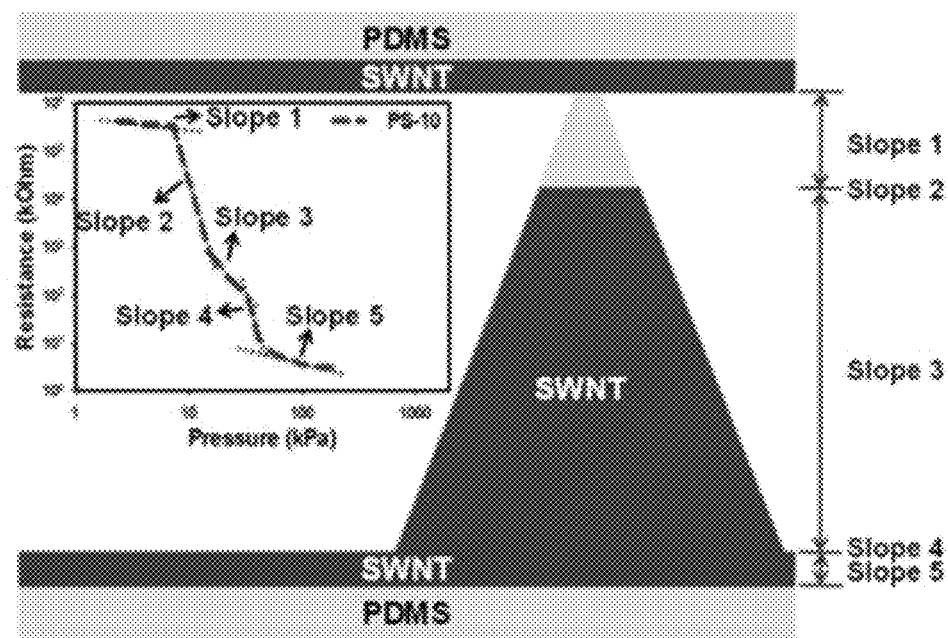

In many embodiments, the electronic force sensors can be stretchable and transparent sensors, while also having a widely tunable dynamic range of resistance. The elasticity of such sensors can be tested by stretching the sensors at both twenty-percent and fifty-percent strains. FIGS. 8E-F uses PS-10 in order to demonstrate properties which apply to many embodiments, and may not be attributed solely to the electronic force sensor PS-10. The electronic force sensor PS-10 is shown to maintain its functionality in FIG. 8E. PS-10 exhibited changes in resistance of up to five orders of magnitude at twenty percent strain. At fifty-percent strain, changes in resistance of up to four orders of magnitude can be maintained.

To further assess the resistance response, the slopes of the response curve of the electronic force sensor can be analyzed. As shown in FIG. 8F, five different kinds of slopes are observed in the response curve of PS-10. As the force is applied, slope 1 corresponds to the counter electrode touching the top of the recoverably-deformable structures (absent of SWNTs), but before the counter electrode touches the SWNT-coated parts. During this period, the slope is observed to be nearly flat as the force sensors are maintained in a non-conductive status. Slope 2 corresponds to the counter electrode (e.g., the first opposing electrode 101 illustrated by FIG. 1A) first contacting the SWNT-coated parts of the recoverably-deformable structures. The steepness of slope 2 is a result of the SWNT-coated parts of the recoverably-deformable structures providing a large sheet resistance to reduce the resistance dramatically. Slope 3 is generated when the counter electrode is in contact with the SWNT-coated recoverably-deformable structures just before touching the base of SWNT-coated PDMS. Slope 4 is generated when the counter electrode touches the base of SWNT-coated PDMS. Finally, the region where the curve of the resistance response of PS-10 becomes saturated is slope 5.

Figure 9A:
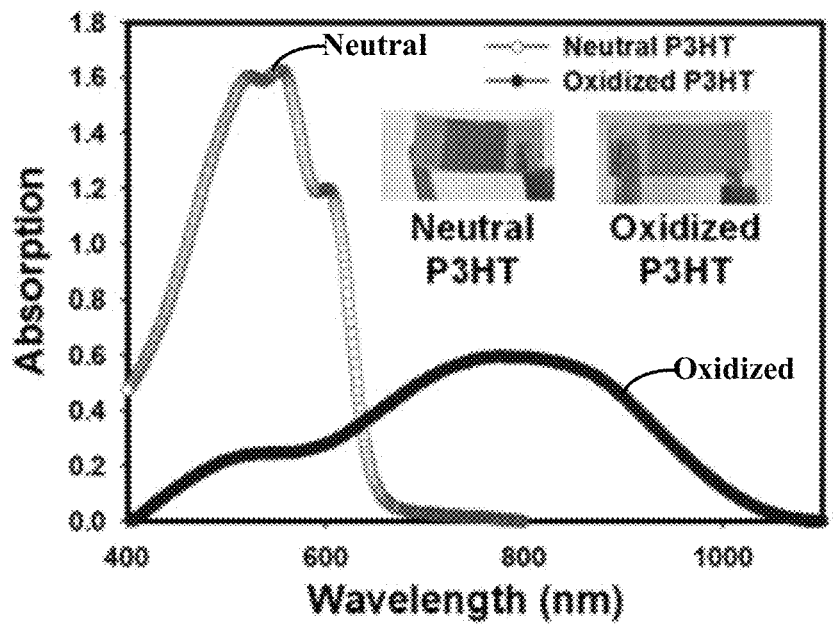
FIGS. 9A-9F illustrate example properties of electronic force sensors, in accordance with various embodiments.
Figure 9B:
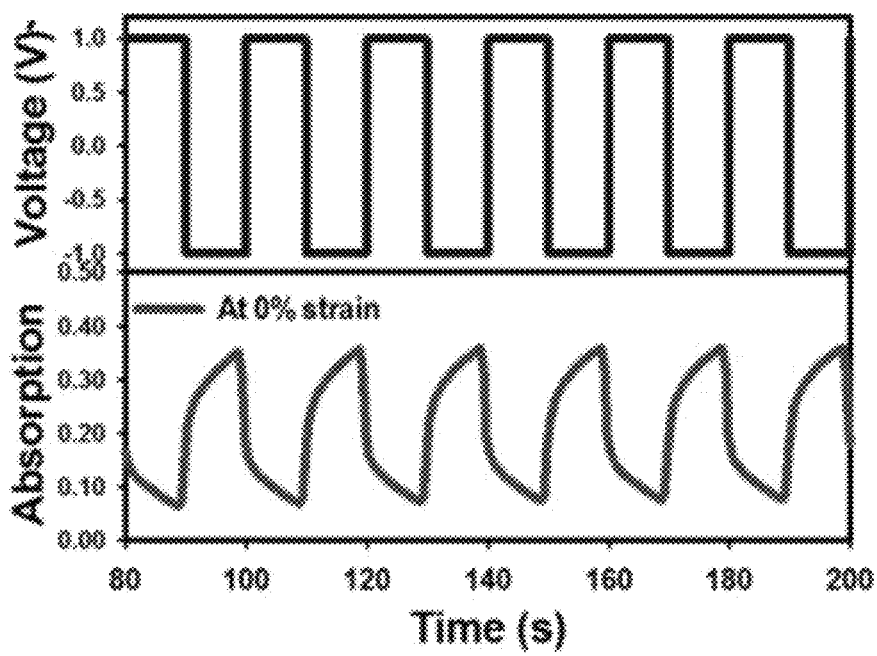
Figure 9C:
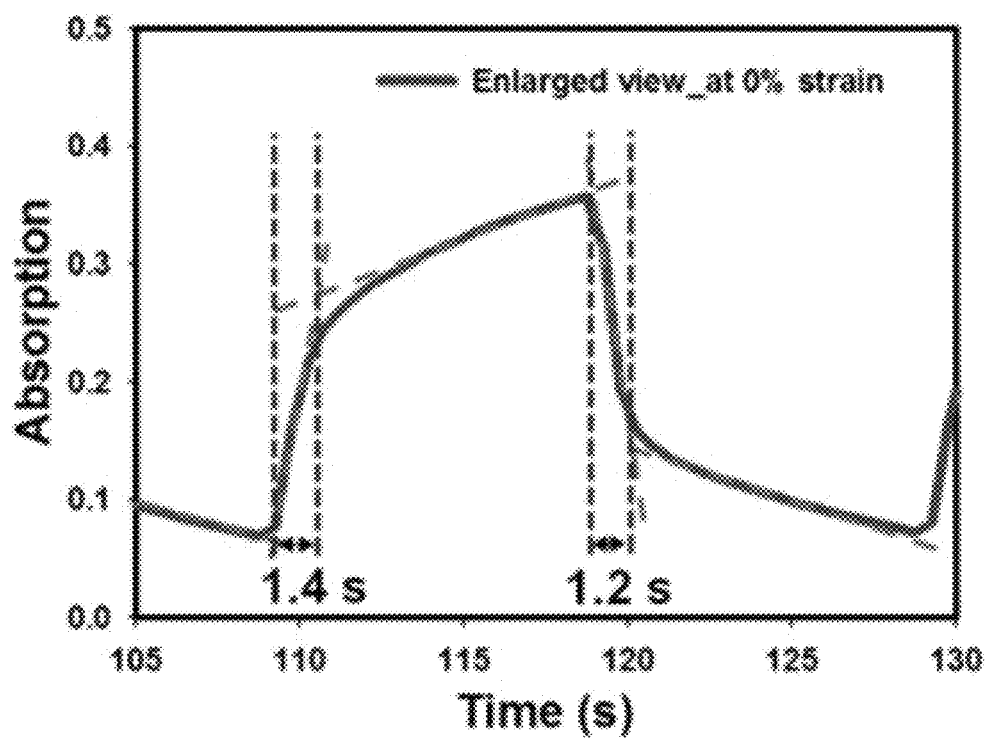
Figure 9D:
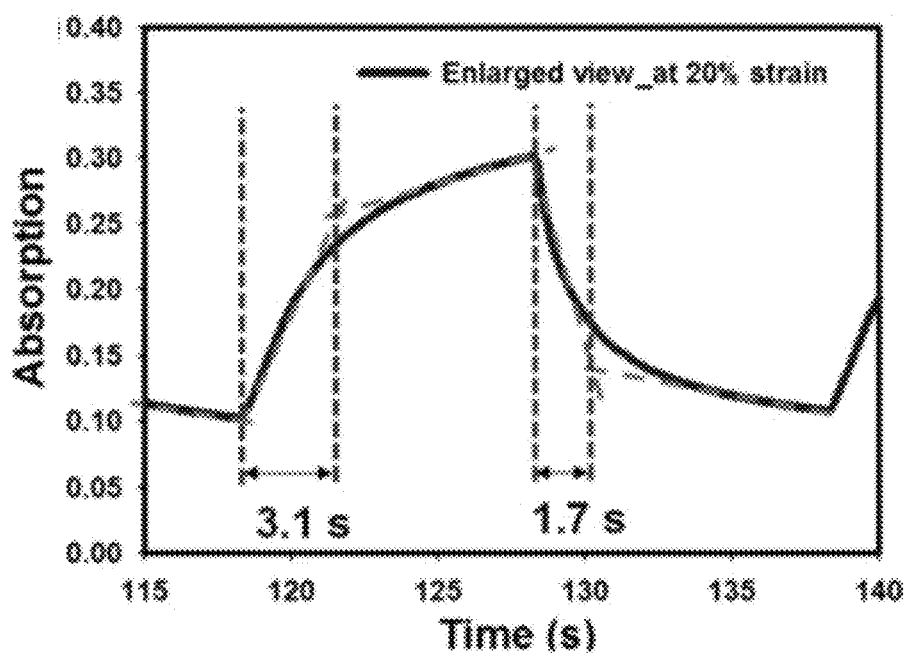
Figure 9E:
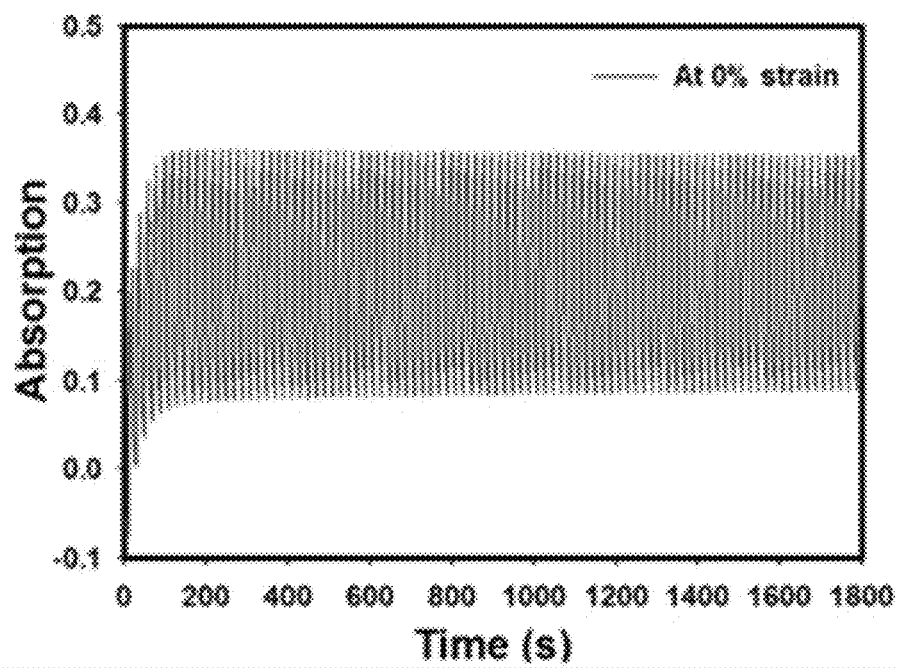
Figure 9F:
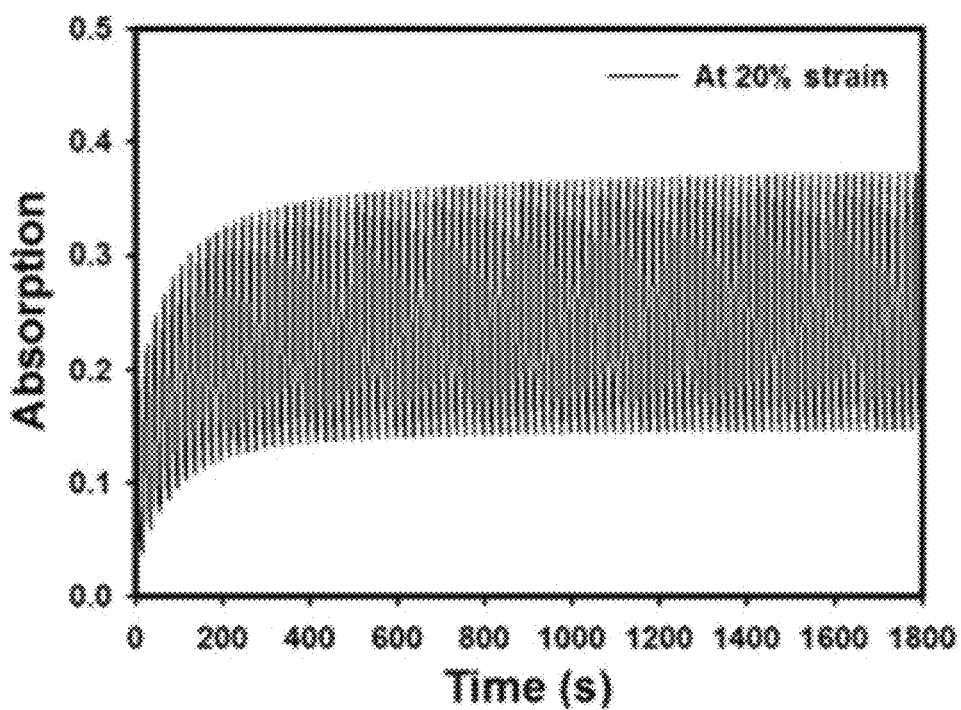

FIGS. 9A-9F illustrate example properties of electronic force sensors, in accordance with various embodiments. FIG. 9A shows the UV-Vis spectra of stretchable polymer-based ECDs. The maximum absorption of neutral P3HT can be ca. 550 nm, while oxidized P3HT can be red-shifted to ca. 800 nm. The kinetic absorption measurement is used to determine the switching behavior and stability of the stretchable ECDs at 550 nm through cycling a bias voltage between 1.0 V and −1.0 V with a 10 second step, as shown in FIG. 9B. Notably, the low driving voltage of ±1.0 V is beneficial for the concept of low power consumption. FIG. 9C shows an enlarged view of FIG. 9E for analysis of the switching time at zero-percent strain. The neutral state (turning dark red) and oxidized state (turning pale blue) switching time can be seen as 1.4 seconds (s) and 1.2 s, respectively. FIG. 9D shows an enlarged view of FIG. 9F at twenty-percent strain. The switching time for a neutral state (turning dark red) and an oxidized state (turning pale blue) can be increased at 3.1 s and 1.7 s, respectively. Both the stretchable organic ECDs at both zero-percent and twenty-percent strains show stable cyclic switching, and the color contrast can be maintained at over ninety-percent even after long-term measurement. However, the switching speed can be degraded because of the increased resistance. Notably, a commercially available poly(3-hexylthiophene-2,5,diyl) (P3HT) can be used to demonstrate the fully stretchable ECDs; however, the invention is not limited to use of only P3HT, other electrochromic polymers can be used.

Figure 10A:
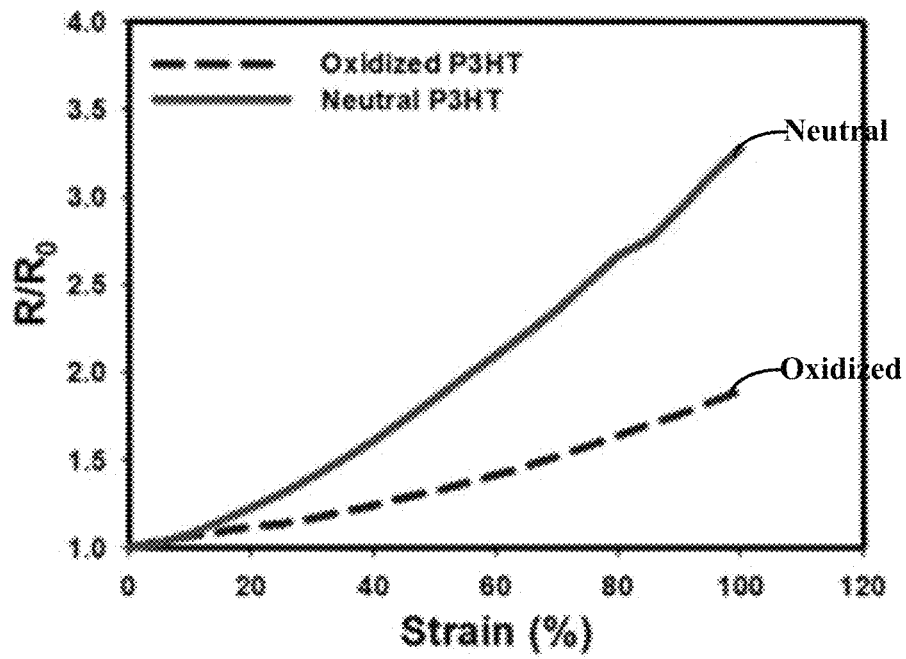
FIGS. 10A-10B illustrate example properties of electronic force sensors, in accordance with various embodiments.
Figure 10B:
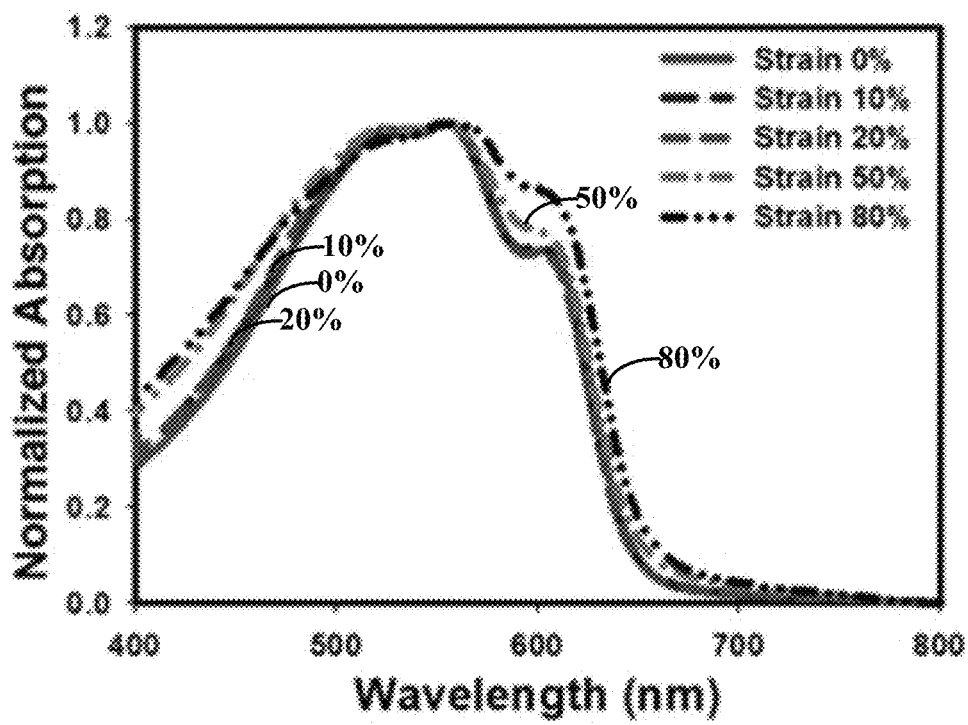

FIGS. 10A-10B illustrate example properties of electronic force sensors, in accordance with various embodiments. To elucidate the relationship between strain and electrical properties of the neutral and oxidized P3HT/SWNT stack in the ECDs, the resistance versus strain can be measured for both the neutral and oxidized P3HT/SWNT films. In particular experimental embodiments, the films can both be soaked in the liquid electrolyte (0.1 M $LiClO_4$ in $CH_3CN$) for 30 seconds before the stretching measurement. FIG. 10A plots the normalized resistance of these two thin films when stretched from zero-percent to one hundred-percent strain. The resistance of the oxidized P3HT at one hundred-percent strain can increase to around 1.9 times, while the neutral P3HT can increase to around 3.2 times at one hundred-percent strain. At twenty-percent strain, the resistance of the oxidized and neutral P3HT can increase 1.23 and 1.12 times to its original resistance, respectively. If the thin films are stretched to fifty-percent strain, the resistance of the neutral and oxidized P3HT can be increased to 1.85 and 1.33 times, respectively. The higher increase in the resistance of neutral P3HT may lead to the degradation of the switching speed of the ECD at fifty-percent strain. The slower resistance increases in the oxidized P3HT thin film may be due to the higher concentrations of holes in the oxidized P3HT thin film helping to maintain more conductive pathways even at elevated strains to inhibit the resistance increase.

FIG. 10B further illustrates the effects of strain on the ECDs by comparing the absorption spectra of P3HT under different strain levels. The absorption shoulder of P3HT at 600 nm, typically assigned to the aggregation state of P3HT, increases when subjected to greater than fifty-percent strain. This demonstrates that the fraction of aggregated polymer increased during stretching, which is can be due to strain-induced chain extension and subsequent crystallization.

Various embodiments of the present disclosure may be applied to wearable electronics. A key parameter for wearable electronics is weight. The lightweight capability, in some embodiments, can be achieved by utilizing an ultrathin (1.2 μm thick) polyethylene naphthalate (PEN) film to fabricate the organic ECDs. The fabrication process is similar to that of organic ECDs on a PDMS substrate. The device may weigh around 9.3 mg $cm^{-2}$, which is lighter than the weight of a similarly sized device on textile, such as a conventional lab coat made from a cotton polyester blend (16.7 mg $cm^{-2}$). As a result, stretchable organic ECDs, such as the abovementioned embodiments, have fast color responses, are transparent and lightweight, and can be ideal for wearable electronics.

FIGS. 11A-11E illustrate example properties of electronic force sensors, in accordance with various embodiments. Many embodiments employ the concept of a tactile controlled device with the color being dependent on the force a user applies. An integrated stretchable force sensor (e.g., a pressure sensor (PS)) and stretchable ECD, denoted as "PSEC" can be fabricated. An example schematic layout of the PSEC is shown in FIG. 2 as sensor circuitry 232. Based on this integration, the color can be controlled by applying various pressure levels.

Figure 11A:
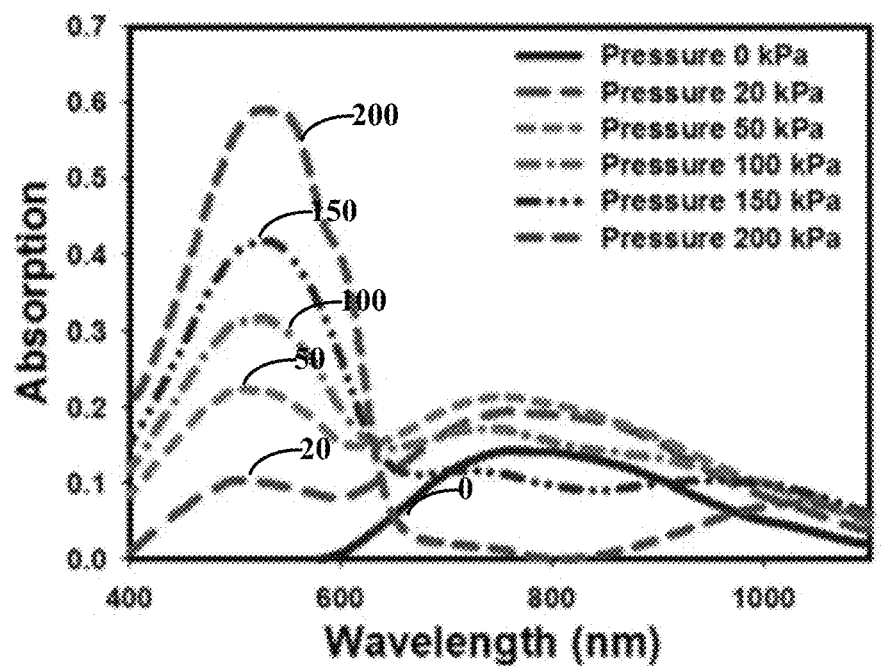
FIGS. 11A-11E illustrate example properties of electronic force sensors, in accordance with various embodiments.

FIG. 11A illustrates the spectroscopic change measured by a UV-Vis absorption spectrum by applying different forces from 0 to 200 kPa. In experimental embodiments, each of the applied forces is maintained for 10 seconds, the device is then turned off and the absorption spectrum is measured. An absorption peak at 800 nm can be observed for the oxidized P3HT before any pressure is applied. With increasing pressure, the appearance of another absorption peak at 550 nm can be observed (which can be attributed to the formation of neutral P3HT), and its intensity can be observed to increase with increasing applied pressure. Various absorption spectrum/colors can be used to further quantify the corresponding magnitude of the applied pressure. Through introduction of various colors of the electrochromic polymers, the PSEC system can be designed with a wide range of colors and can be modulated by various forces. As such, force sensors can distinguish the different applied force levels via the absorption levels. In addition, to realize the power consumption property of the PSEC system, the absorption band/color of the ECD at either natural or oxidized states can be measured.

Figure 11B:
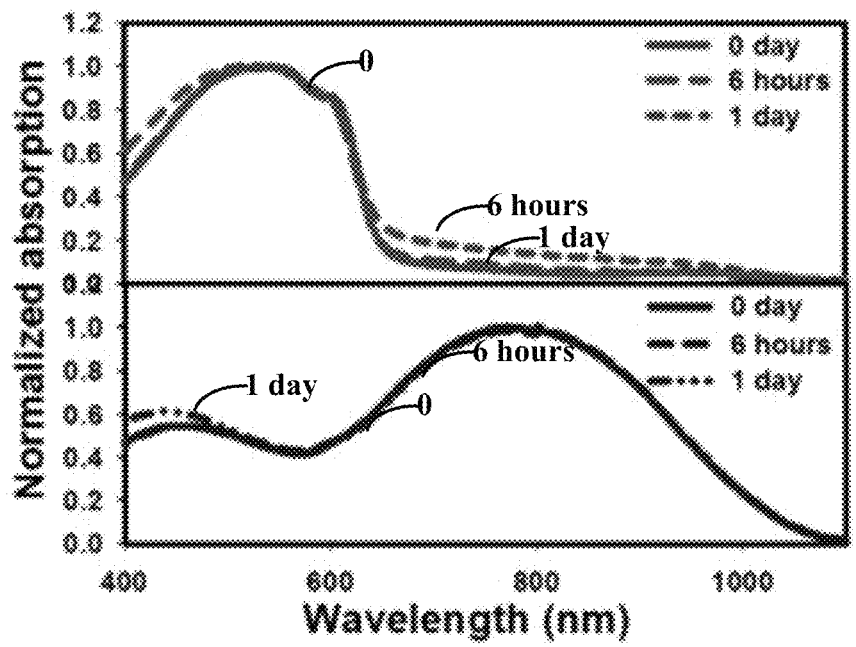

As FIG. 11B illustrates that the absorption band/color of neutral and oxidized P3HT can be maintained for six hours at an ambient environment condition without applying any additional bias. A slight increase in the absorption band of the ECDs after one day may be observed. This demonstrates that for various embodiments to maintain a color, a constant bias is not necessary, which can lower power consumption. A commercial electrochromic polymer P3HT can be used to produce the results seen in FIGS. 11A-B, though other electrochromic polymers can be used.

In some embodiments, response times of color change (using UV-Vis measurements) operate as a function of applied forces. Thus, the real-time absorption change can be used to determine the magnitude of the pressure that is applied.

Figure 11C:
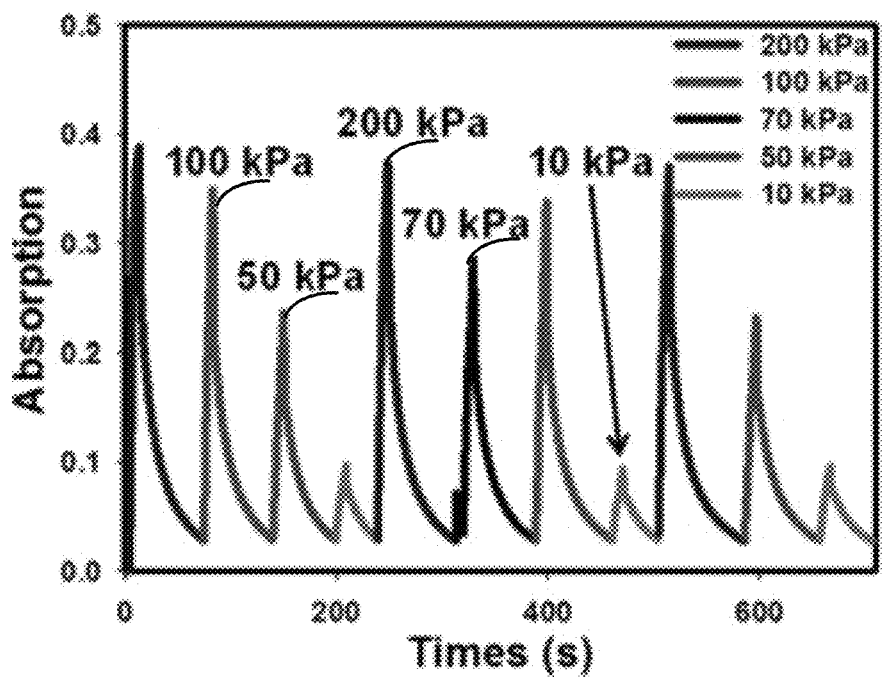

FIG. 11C shows the results of different pressures applied to a PSEC and maintained for 10 s. As illustrated, in some embodiments, the largest changing response of absorption can be obtained using the highest pressure of 200 kPa. As the applied force is decreased down to 150, 100, 70, 50, and 10 kPa, the corresponding absorption levels decrease as well.

Figure 11D:
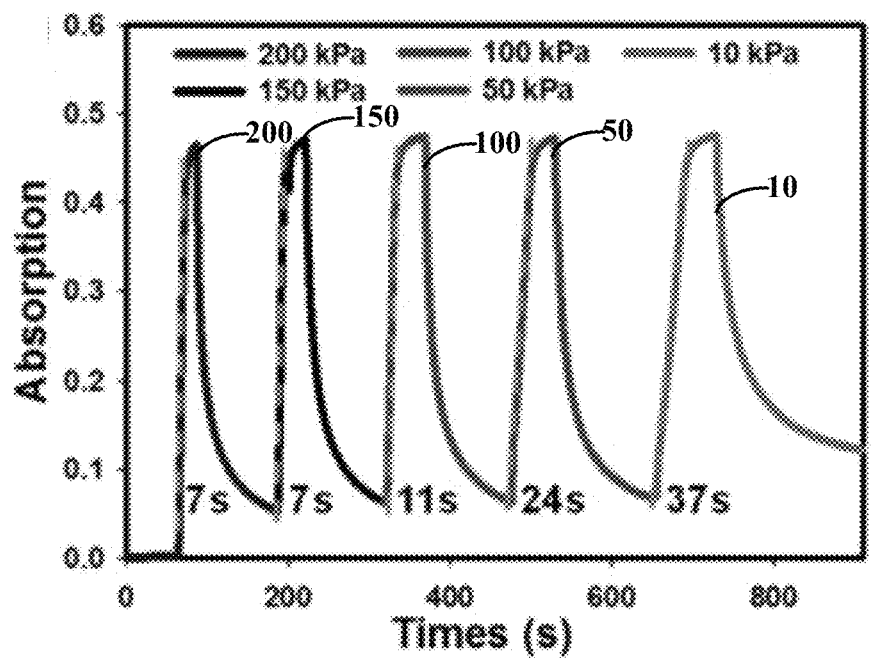

FIG. 11D illustrates application of increasing forces resulting in decreasing time for the ECDs of the PSEC system to reach color saturation. For example, an applied force of 200 kPa may use 7 seconds to achieve color saturation, while an applied force of 10 kPa can reach color saturation after 37 seconds. Notably, the value of the slope can be used to quantify the magnitude of force applied. The slope of each response curve can decrease when a lower force (e.g., pressure) is applied.

Figure 11E:
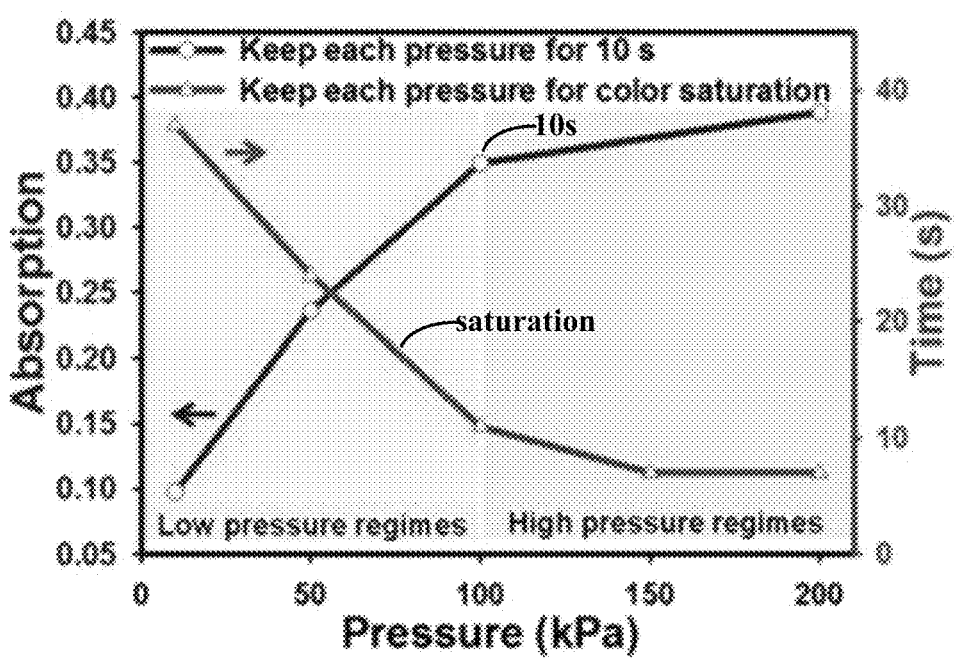
Figure 12A:
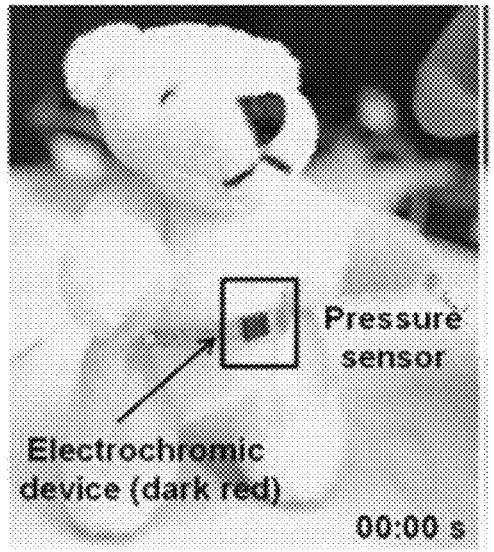
FIGS. 12A-12D illustrate an example of an electronic force sensor changing color, in accordance with various embodiments.
Figure 12B:
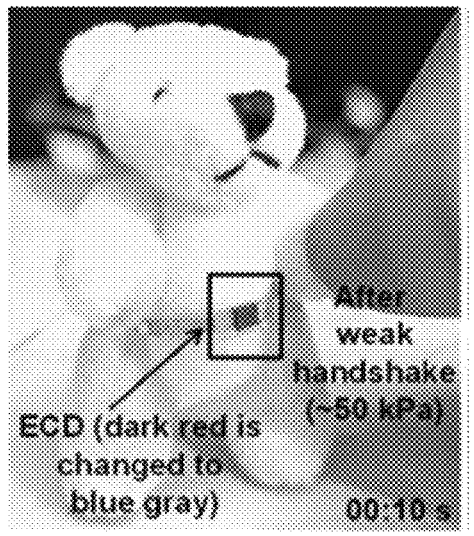
Figure 12C:
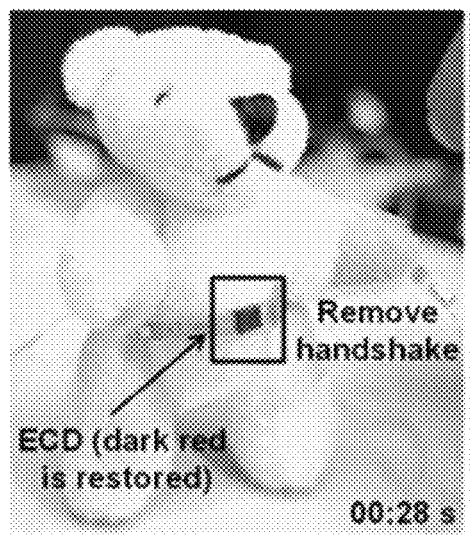
Figure 12D:
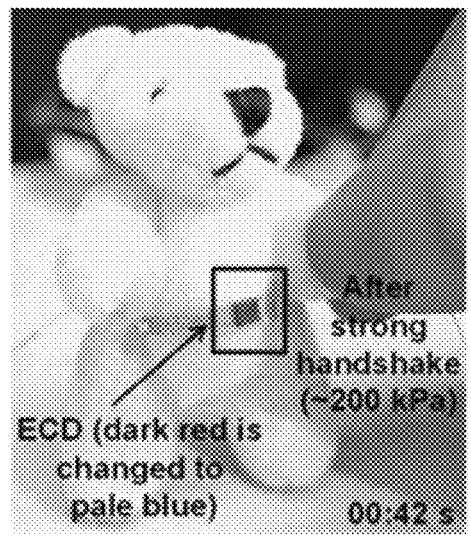

FIG. 11E shows the relation between forces applied (pressure), absorption of the ECDs, and time. Based on the response-time measurement, the lighter pressure regime (from 0 to 100 kPa) provides a dramatic absorption change and saturation time change, whereas the higher pressure regime (from 100 to 200 kPa) shows a slight absorption change and saturation time change. Consequently, the PSEC system can be operated at high pressures to achieve quicker color saturation. Alternatively, the PSEC system can be driven at a lower pressure to provide a larger dynamic range to fine-tune the various colors.

FIGS. 12A-12D illustrate an example of an electronic force sensor changing color, in accordance with various embodiments. The example in FIGS. 12A-D show a demonstration of an electronic force sensor with both interactive color-changing and tactile sensing properties. This particular embodiment includes a stretchable pressure sensor and a stretchable color-changeability which can be mounted and connected onto the abdomen and the back of a hand of a commercially purchased teddy bear. Upon applying a weak handshake (around 50 kPa), the color of the ECD can turn from dark red to blue gray. Releasing the handshake reverts the color to dark red, while applying a strong handshake (around 200 kPa) changes the color again to pale blue. In each figure, the time elapsed can be seen in the bottom right. This demonstrates the expression of information from tactile sensing into visible color changes, and also the tunability of the color related to the various forces applied.

Figure 13:
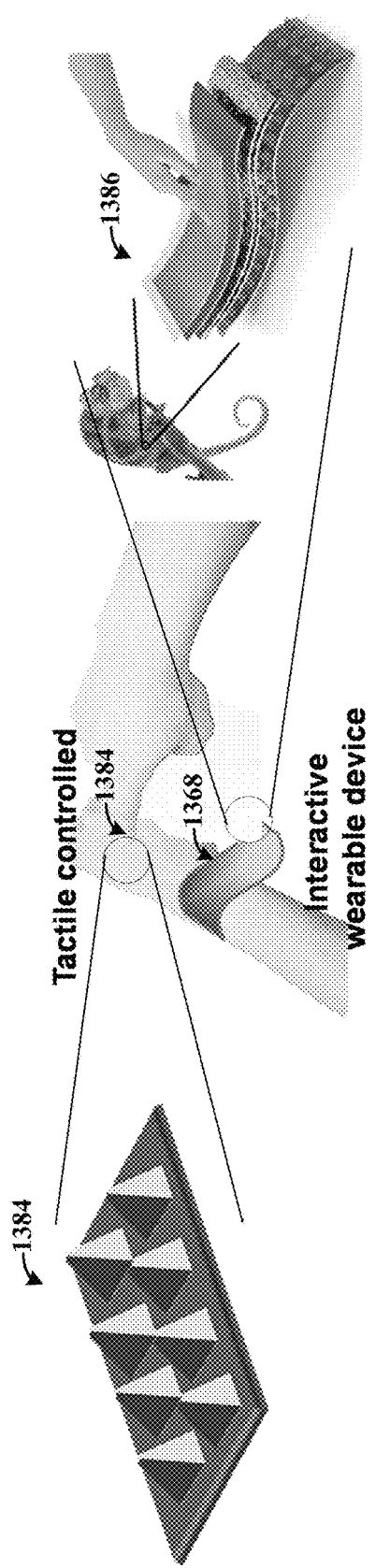
FIG. 13 illustrates an example of a wearable device, in accordance with various embodiments.

FIG. 13 illustrates an example of a wearable device, in accordance with various embodiments. A wearable device 1368 in various embodiments can be used as an electronic skin, or e-skin device. The e-skin device color can be controlled through varying the applied force 1384 along with the applied force duration. The wearable device 1368 can include the apparatus illustrated by FIG. 1, such as the electronic force sensor and sensor circuitry. As such, the e-skin device's color change can also be utilized to distinguish the force applied. The e-skin device can include a force sensor that is integrated with a stretchable ECD. Various embodiments depict an e-skin device as a wearable device, such as FIG. 13, but other embodiments may be used as implantable devices, such as a device to monitor arterial blood pressure.

Notably, for the user-interactive devices, the toxicity and carcinogenicity of carbon nanotubes (CNTs) have raised concerns as they have rather similar shapes as asbestos. Previous reports have demonstrated that the longer and thicker CNTs (lengths >5 μm and diameter >20 nm) can induce significantly more DNA damage and inflammation compared to the lower-aspect-ratio. Much shorter and smaller diameter SWNTs, in various embodiments, can be used (bundle lengths range from 0.5-1.5 μm, along with an average bundled diameters of 4-5 nm), which can reduce the potentially adverse effect. Furthermore, a proper encapsulation of this system can be used in various embodiments. A number of elastic substrates, such as silicone, polyurethane or fluoroelastomers, are biocompatible and highly stretchable. Additionally, CNTs can be replaced with silver nanowires, metal particle films, and/or stretchable conductive polymers or polymer carbon composite conductive materials.

FIGS. 14A-C illustrate example implementations of an electronic force sensor, in accordance with various embodiments. In some embodiments, the electronic force sensor including the tactile control function is integrated into a watch and/or a watchband 1489 to allow for a user-interactive color-changeable function, as illustrated by FIG. 14A.

FIG. 14B illustrates a wearable device implementation where the ECDs are implanted into a piece of clothing 1491 (e.g., shirts, pants, hats, sunglasses) while the sensor circuitry and the force sensor are incorporated in the watch for remote control of the clothing 1491 colors. Various embodiments can be applied in sports, in the general fashion world, or as adjustable camouflage.

FIG. 14C illustrates the application of electronic force sensors in neutrally-integrated prosthetic skin or smart robot 1492. Various embodiments directed to robotics include the application of the device on the curvilinear and dynamic surface of robots or prosthetics. The tunable resistive force sensor can be used to mimic the different force responses of biological mechanoreceptors and permit the robot 1492 to sense pressure/touch. The electronic force sensor can also be used to change the appearance (color) of prosthetics and robots 1492 by applying different forces.

In a number of specific embodiments, the electronic force sensors can be incorporated into an elastic band and used as a strain sensor. In other related embodiments, the electronic force sensors can be combined with wireless circuitry to be powered and/or transmit sensing information wirelessly. Further, in specific embodiments, the electronic force sensors can be placed inside an object (e.g., battery, reactor, food package, storage package) and/or a human or animal to monitor size change(s) of an organ (e.g., heart, liver, stomach, ovary, lung, artery, inside artery, inside heart). For example, the electronic force sensors can be used to monitor change(s) of shape of an object, such as a pipe, a reactor, a battery, food package, storage package.

In accordance with various specific embodiments, the structures (e.g., the recoverably-deformable structures) include conductive material that is pattern at depths and/or particular surface distributed on and/or within the structures to provide design versatility for designing the electronic force sensors that can be achieved in electrical characteristics. The threshold switching range of resistance and/or the onset for the electronic force sensors can be determined by the height of the conductive material on the structures and/or the shape of the impedance as compared to the force curve can be determined by the distribution of the conductive material (e.g., CNTs) within the structures.

FIGS. 15A-15F illustrates examples of specific electronic force sensors with different responses to force, in accordance with various embodiments. As illustrated by FIGS. 15A-15D, the electronic force sensors include structures 1504 between opposing electrodes (e.g., formed on one of the opposing electrodes 1502). As used herein, structures can include or refer to the recoverably-deformable structures as previously described and are referred to as structures for ease of reference. The structures 1504 can have different conductive-resistive elements, such as differently shaped and/or dimensions of conductive portions 1505 and resistive portions 1503 and/or different ratios of conductive material to resistive material within the structures.

Figure 15A:
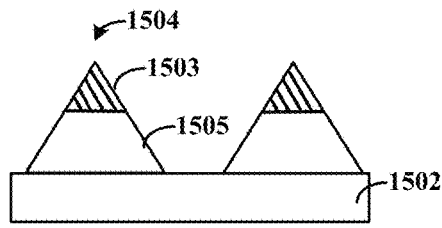
FIGS. 15A-15F illustrates examples of specific electronic force sensors with different responses to force, in accordance with various embodiments.
Figure 15B:
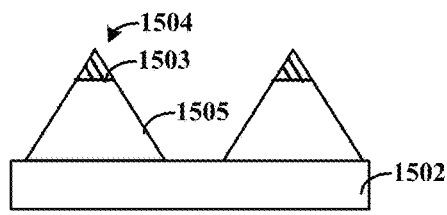
Figure 15C:
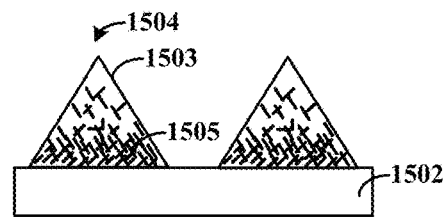
Figure 15D:
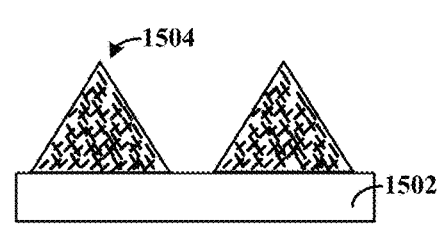
Figure 15E:
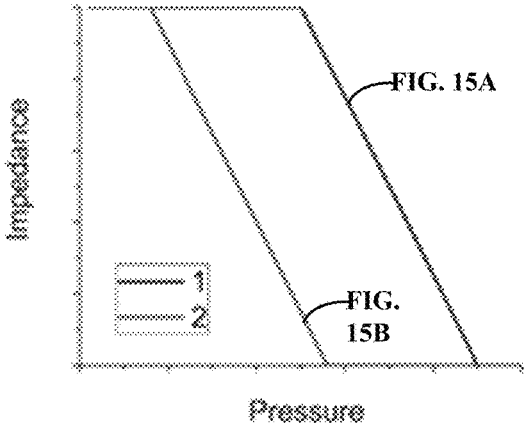

FIGS. 15A, 15B, and 15E illustrate the effect of the height of conductive material on the threshold switching range of resistance. As illustrated by FIGS. 15A and 15B the height of the conductive material (e.g., the conductive portions 1505) on the surface of the structures 1504 can be adjusted to adjust the threshold switching range. For example, the structures 1504 of FIG. 15B have a greater height of the conductive material as compared to the structures 1504 of FIG. A. FIG. 15E illustrates the effect of the different heights of the conductive material on the threshold switching range of resistance of the resulting electronic force sensors. As illustrated, the electronic force sensors illustrated by FIG. 15B has a lower threshold switching range than the electronic force sensor of FIG. 15A.

Figure 15F:
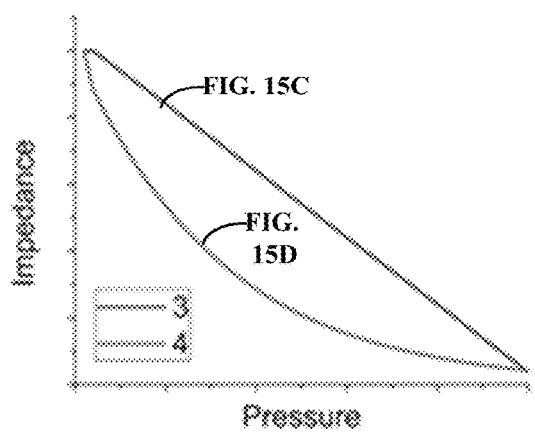

FIGS. 15C, 15D, and 15F illustrate the effect of the distribution of the conductive material within the structures on the shape of the impedance as compared to the force curve. FIG. 15C illustrates structures 1504 with conductive material at different distributions throughout the structures 1504. In some embodiments, the different distribution of the conductive material can result in structures 1504 that have conductive portions 1505 and resistive portions 1503 relative to one another. FIG. 15D illustrates structures 1504 with conductive material at a same distribution throughout the structures 1504. FIG. 15F illustrates the effect of the different distributions of the conductive material within the structures on the shape of the impedance as compared to the force curve. For example, the electronic force sensor illustrated by FIG. 15C can include a linear curve of impedance as compared to the force and the electronic force sensor illustrated by FIG. 15D can include a non-linear curve of impedance as compared to the force.

There are a vast number of different applications for pressure sensors, which can include different sensor characteristics. For instance, different parameters can influence the suitability for the different applications. Embodiments in accordance with the present disclosure can include design of force sensors for various different applications that have variations in sensor use and/or requirements. For example, the over-all electronic force sensor size, the shape and size of the structures between the electrodes, the shape and/or location of the conductive material and/or the distribution of the conductive material can be adjusted to design and fabricate electronic forces sensors on-demand that have different characteristics for different applications. Such designs can be made to meet the needs of many companies that require a relatively small number (e.g., <100,000) of sensors. Design and fabrication of the different sensors can include changing the sensing characteristics by changing the size or shapes of the structures (e.g., pyramids), the modulus of the elastomer, and the content and distribution of conductive material (e.g., fillers). The approach can allow many of the sensor characteristics to be tuned, including dynamic range, sensitivity, impedance range, and/or the shape of the stimulus-response curve. This type of versatility can be useful for a field like force and/or pressure sensors that encompasses applications with such diverse requirements.

In various specific embodiments, electronic force sensors can include linear or non-linear force characteristics that can be tuned by the shape of the structures and/or the conductive material distribution. Many resistive pressure sensors have characteristics that are limited to have a particular shape of the stimulus-response curve. For example, devices based on intrinsic piezoresistance have a stimulus-response curve that has a linear relationship between resistance and indentation. Devices based on contact resistance typically have a power law relationship between resistance and force. However, in some various embodiments, electronic force sensors are able to produce a different relationship between pressure and resistance. For example, when making a comparative sensor such as one that is used to measure shear force or hardness, electronic force sensor implementations can have linear characteristics. Linear characteristics can be produced by tuning the shape of the recoverably-deformable structures or the vertical distribution of fillers within the matrix of the recoverably-deformable structures.

Figure 16C:
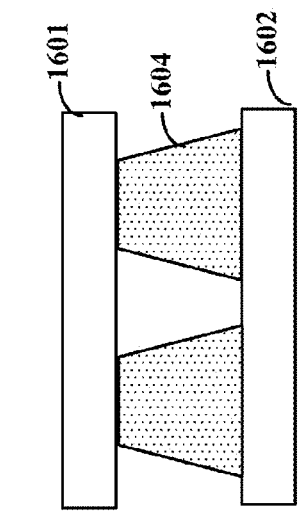
FIGS. 16A-16D illustrates examples of specific electronic force sensors with different responses to force to measure hardness characteristics, in accordance with various embodiments.
Figure 16D:
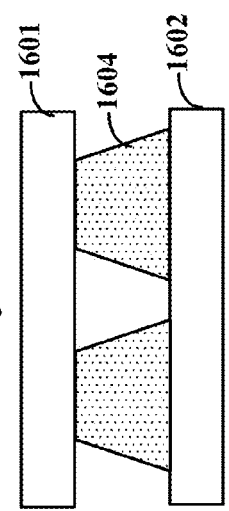
Figure 16A:
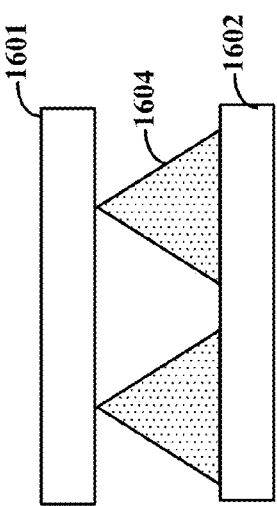
Figure 16B:
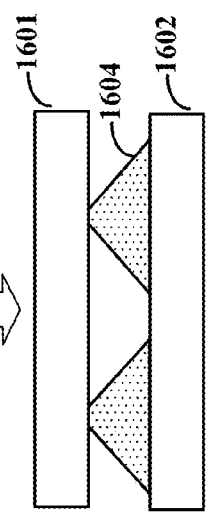

FIGS. 16A-16D illustrates examples of specific electronic force sensors with different responses to force to measure hardness characteristics, in accordance with various embodiments. Hardness can be measured, in some embodiments, using two electronic force sensors with different compliances. FIGS. 16A-16B illustrate a first electronic force sensor and FIGS. 16C-16D illustrates a second electronic forces sensor. The compliance of the respective first and second electronic force sensors can be tuned by change the material, the modulus (e.g., distribution) of the sensor, the size or shape of the structures, and/or the vertical distribution of the conductive material. The tuning of the electronic force sensors can modulate the shape of the force response curve.

As illustrated by FIG. 16A and FIG. 16B, the electronic force sensors include structures 1604 between opposing electrodes 1601, 1602. The structures 1604 can be different shapes, such as the pyramid shape of FIG. 16A and the hexahedron of FIG. 16B. FIG. 16C and FIG. 16D illustrate the responses of the electronic force sensors of FIGS. 16A and 16B, respectively, in response to the same force applied. In various embodiments, the force includes a hardness of a surface. A surface, based on the hardness affects the deflection of the two electronic force sensors differently. Example implementations for measuring hardness of a surface using two electronic force sensors can include measuring the ripeness of fruit (in stores and/or for packaging facilities), measuring the hardness of tissue (human, animal, and/or otherwise) in instrumented surgery (for identifying tumors), measuring the hardness of tissue for automate mammograms, among other specific implementations.

The structures 1604 can have different dimension sizes depending on the specific implementations. For example, structures used for measuring ripeness of fruit can have sizes/dimensions of 5 to 100 um, structures used for measuring the hardness of tissue in instrumented surgery can have dimension sizes/dimensions of 2 to 20 um, and structures used for measuring hardness of tissues for automated mammograms can have sizes/dimensions of 2 to 100 um for targeting resolution and/or sensitivity characteristics. The sizes/dimensions of the structures, as used herein, can include the width, the height, the length, the diameter, a cross-section, the overall volume, and/or a combination thereof (e.g., both the width and height, all three of the width, height, and length, etc.) of the structures, in various embodiments. Alternatively, the sizes/dimensions can include the width, the height, the length, the overall volume, and/or a combination thereof (e.g., both the width and height, all three of the width, height, and length, etc.) of the electronic force sensor.

FIGS. 17A-17D illustrates examples of specific electronic force sensors with responses to shear force, in accordance with various embodiments. Shear forces can be measured using electronic force sensors in a number of implementations. FIGS. 17A-17B illustrates an example implementation of an electronic force sensor that can measure shear forces. As illustrated by FIG. 17A, the electronic force sensor includes a plurality of structures 1704 located between two opposing electrodes 1701, 1702. The structures 1704 can include conductive material that is dispersed throughout at a common ratio (e.g., homogeneously dispersed). One opposing electrode 1701 is located proximal to where the force is thought to and/or designed to interface with the electronic force sensor. The particular electrode 1701 includes a protruding-interface contact 1795 that is designed interface with the force applied to the electronic force sensor and to concentrate the forces in different directions. As illustrated by FIG. 17B, the protruding-interface contact 1795 concentrates the force and results in different structures 1704 deforming differently to the force or multiple forces. Such an approach can be referred to as a comparative approach.

Another approach is illustrated by FIGS. 17C-17D. In various embodiments, one side of the plurality of structures 1704 (located between the opposing electrodes 1701, 1702) is coated with a conductive material. The side of the structures 1704 forms the conductive portions 1705 of the structures 1704 and the remaining sides include resistive portions 1703 (e.g., are not coated in the conductive material and/or include a resistive material). As illustrated by FIG. 17D, in response to a particular shear force (e.g., right shear force), the conductive portions 1705 come in contact with the opposing electrode 1701 and/or the resistive portions 1703 lose contact with the opposing electrode 1701 which results in an increase in conductivity and/or a decrease in resistivity. The electronic pressure sensor illustrated by FIGS. 17C-17D can include anisotropic sensing structures.

Shear force detection can be used in various additional implementations. For example, an electronic force sensor can measure traction forces produced by cells, measure fluid flow in various devices (e.g., fluid flow in a microfluidic device), monitor growth of cells, monitor blood flow or shear forces adjacent to an implanted device, monitor air flow over the wings of an aircraft, and used to adjust grasp force in prosthetic electronic skin, and/or used to identify misalignment between parts in industrial manufacturing applications, among other applications.

Specifically, for monitoring airflow over the wings of an aircraft, the electronic force sensor can be encapsulated to enable measurement of hydrostatic pressure. Pressure difference in air pressure can be large on the surface of the aircraft wing and thus, the measured pressures can be large.

Figure 19:
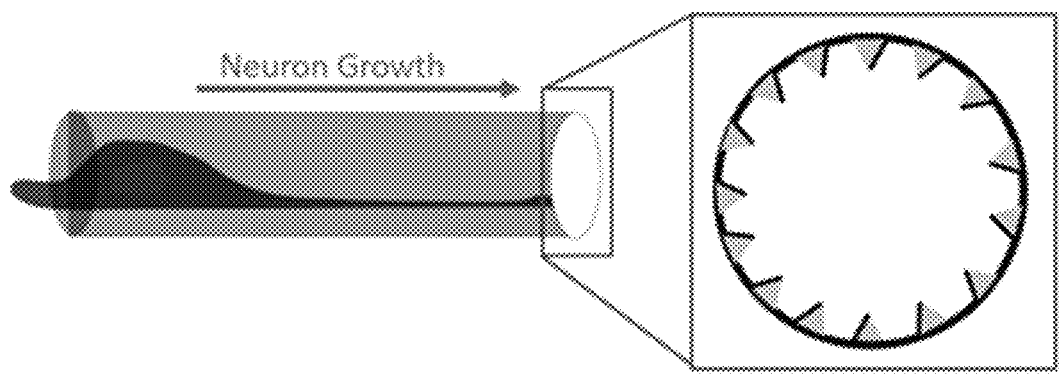
FIG. 19 illustrates an example of a specific electronic force sensor with different responses to force to monitor growth of a cell, in accordance with various embodiments.

The dimensions/sizes of the structures or the size of the electronic force sensor can vary depending on the use. For example, structures or the overall size of the electronic force sensor used to measure fluid flow in various devices can be limited by the size of the device (e.g., smaller than dimensions of the device). As a specific example, an electronic force sensor used to detect flow within a microfluidic device can include structures with dimensions/sizes that are smaller than the size of the microfluidic channels, such a structures with 2-20 um dimensions/sizes. An electronic force sensor used to measure growth of a cell can include structures with dimension/sizes limited by the cell and/or the device the cell is grown in. For example, an electronic force sensor used to detect growth of a cell in a sieve electrode, as illustrated by FIG. 19, may include structures (or dimensions of the electronic force sensor) with dimensions/sizes that are smaller than the size of the sieve electrodes structure, such as structures or an electronic force sensor with dimensions/sizes of less than 10 um. An electronic force sensor used to monitor airflow over wings of an aircraft can include structures with sizes/dimensions that facilitate a dynamic range and sensing of the large forces, such as structures with sizes/dimensions of greater than 50 um. An electronic force sensor used in prosthetic electronic skin, illustrated by FIGS. 20A-20C, can include structures with dimensions/sizes to provide a dynamic range of sensitivity similar to skin, such as structures with dimensions/sizes of 20-100 um. And, an electronic force sensor used to identify misalignment between parts in industrial manufacturing applications can include structures used to provide a dynamic range of sensing, such as structures with sizes/dimensions of greater than 50 um. Measuring force/pressure ranges in tens of kPa or MPa range (e.g., 20 kPa to 1 MPa or more than 1 MPa) may be useful for measuring the shape of a foot print or body contact area with a bed mattress for bedsore prevention and can be implemented using larger and taller structures with dimensions in the millimeter range (e.g., 1-50 mm).

The sizes/dimensions of the structures can include the width, the height, the length, the overall volume, and/or a combination thereof (e.g., both the width and height, all three of the width, height, and length, etc.) of the structures, in various embodiments. Alternatively, the sizes/dimensions can include the width, the height, the length, the diameter, a cross-section, the overall volume, and/or a combination thereof (e.g., both the width and height, all three of the width, height, and length, etc.) of the electronic force sensor.

Figure 18A:
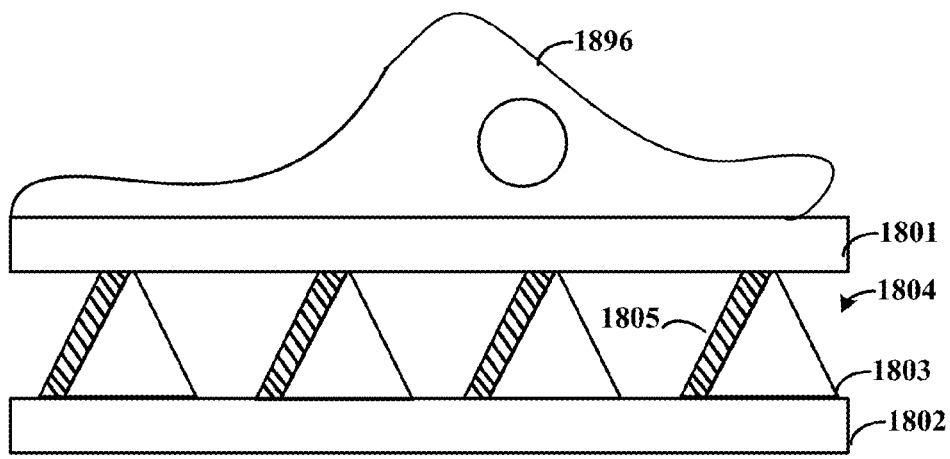
FIGS. 18A-18B illustrates examples of specific electronic force sensors that respond to traction force produced by a cell, in accordance with various embodiments.
Figure 18B:
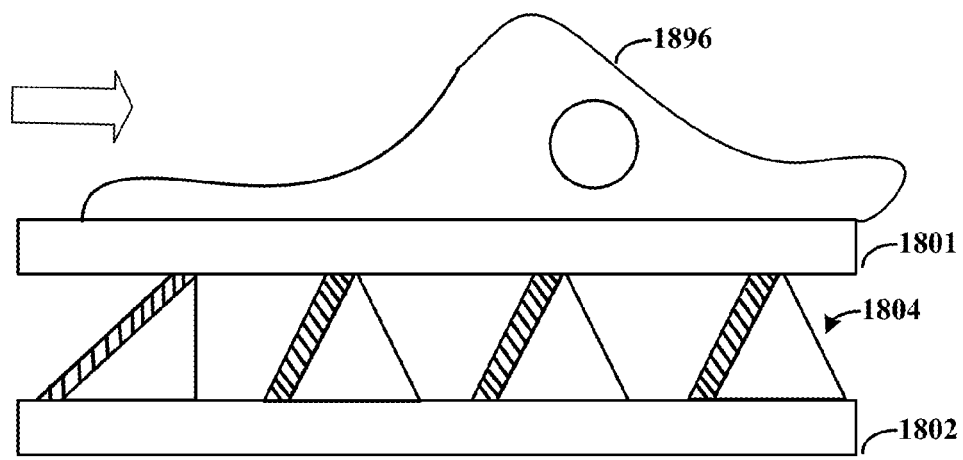

FIGS. 18A-18B illustrate an example of specific electronic force sensor that responds to traction force produced by a cell, in accordance with various embodiments. As illustrated by FIGS. 18A-18B, the electronic force sensor can include a plurality of structures 1804 between the opposing electrodes 1801, 1802 which include conductive-resistive elements. The conductive-resistive-elements can include a conductive portions 1805 and a resistive portions 1803.

Traction forces of a cell 1896 can be detected using the electronic force sensor. For example, the electronic force sensors can be sized based on the size of the cell (e.g., small size, such as 5 um or less for size of the structures 1804). As the cell 1896 moves respective to the electronic force sensor, shear force is generated and measured. The electronic force sensor can include anisotropic sensing structures, such as previously discussed with respect to FIGS. 17C-17D as the shear force generated is small (e.g., a comparative approach may use a footprint that is twice as large as in an anisotropic device). As illustrated by FIG. 18B, as the cell 1896 moves, the structures 1804 are used to detect the shear force.

The structures 1804 can have sizes/dimensions of less than the size of the cell 1896, such as less than 5 um. The sizes/dimensions of the structures 1804 can include the width, the height, the length, the overall volume, and/or a combination thereof (e.g., both the width and height, all three of the width, height, and length, etc.) of the structures 1804, in various embodiments. Alternatively, the sizes/dimensions can include the width, the height, the length, the diameter, a cross-section, the overall volume, and/or a combination thereof (e.g., both the width and height, all three of the width, height, and length, etc.) of the electronic force sensor.

FIG. 19 illustrates an example of a specific electronic force sensor with different responses to force to monitor growth of a cell, in accordance with various embodiments. Cell growth can be monitored and/or measured in tissue grafts and sieve electrodes. For example, a device can be developed that can stimulate the growth of neurons through a small pathway. Further, including one or more electronic force sensors within the pathway can give information about the growth kinetics.

Figure 20C:
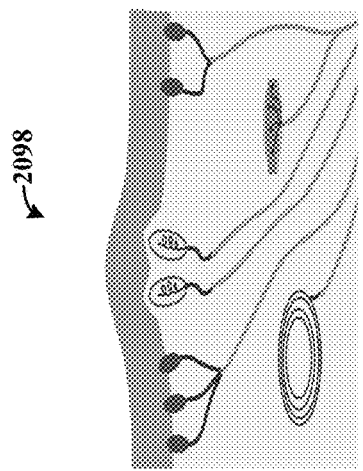
FIGS. 20A-20C illustrates examples of specific electronic force sensors with a plurality of recoverably-deformable structures that are differently oriented to provide direction of applied force and/or response to pressure and shear force, in accordance with various embodiments.
Figure 20B:
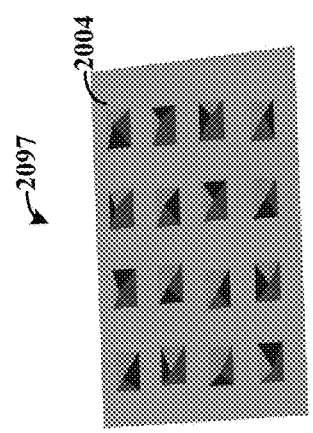
Figure 20A:
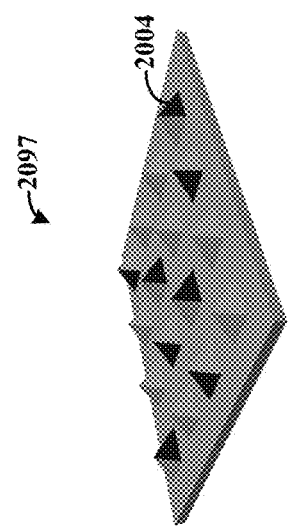

FIGS. 20A-20C illustrates examples of a specific electronic force sensor with a plurality of structures that are differently oriented to provide direction of applied force and/or response to pressure and shear force, in accordance with various embodiments. Detecting shear force can be useful for adjusting grasp force in prosthetic electronic skin. Biological skin contains receptors that are sensitive to the direction of applied force. Furthermore, the biological sensors are sensitive to both pressure and shear force, which is similar to the anisotropic shear force sensors as previously discussed. Consequently, an array of sensors with different orientations can provide the same functionality as biological skin. This can be useful for robotic skin for robots that function in unstructured environments. FIGS. 20A and 20B illustrate an example of an opposing electrode 2097 with a plurality of structures 2004 protruding therefrom. The plurality of structures 2004 can have the same conductive-resistive elements but differently oriented. In some embodiments, the structures 2004 include one side with a conductive material and are oriented differently such that the one side with the conductive material is facing different directions between the respective structures 2004. In other embodiments, two or more sides of the structures 2004 include conductive material with different conductivity values and the plurality of structures are differently oriented such that different conductivity values are facing different directions. Although embodiments are not so limited and the plurality of structures 2004 can additionally and/or alternatively include different conductive-resistive elements (e.g., different ratios of conductive material, different locations, different amounts, different shapes).

The array of structures with different orientations can be used for detecting and/or measuring normal and shear forces in biomimetic electronic skin. The size range of structures can be in the range of 50-100 um in order to achieve sufficient dynamic range for this application, although embodiments are not so limited. For example, as illustrated by FIG. 20C, the array of structures illustrated by FIGS. 20A-20B can be used to measure forces of various cells 2098 with respect to the skin for an electronic skin application.

FIGS. 21A-21D illustrates examples of specific electronic force sensors that respond to strain, in accordance with various embodiments. In stretchable and flexible systems, strain sensors are useful for measuring complex force distributions. An electronic force sensor, in accordance with various embodiments, can be patterned with conductors to measure strain.

Figure 21C:
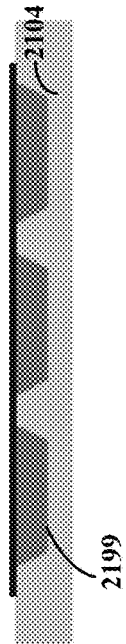
FIGS. 21A-21D illustrates examples of specific electronic force sensors that respond to strain, in accordance with various embodiments.
Figure 21D:
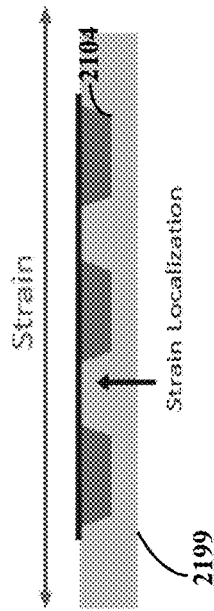
Figure 21A:
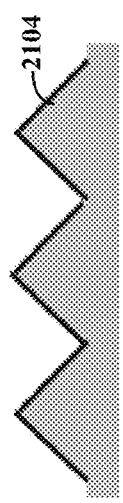
Figure 21B:
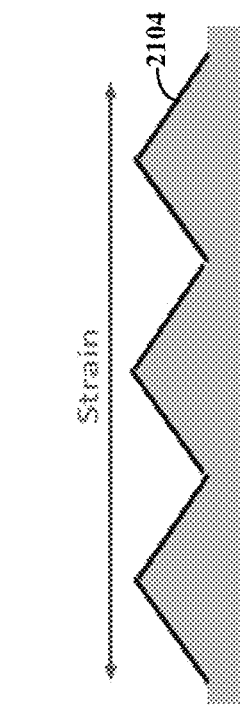

FIGS. 21A-21B illustrates are example of structures 2104 that are patterned to reduce the strain in the active material and used for detecting large strains. FIGS. 21C-21D illustrate an example of patterning regions of different materials 2104, 2199 (of different ratios of conductive material to non-conductive material). By patterning the regions of different materials, the strain force can be localized to increase sensitivity to the strain force for high-precision applications.

As described herein, aspects and embodiments are directed to bio-inspired stretchable electronic force sensors (e.g., e-skin devices) with interactive color changing and tactile sensing properties. This is realized through the development and integration of a stretchable tunable resistive force sensor and stretchable organic electrochromic devices (ECDs). This type of force sensor, besides detecting applied pressure, is able to distinguish varying applied pressures or other forces through real-time visible color change. Further, such electronic force sensors demonstrate low power consumption, can be interactive and color-changeable, and can be readily prepared by a cost-efficient all-solution processing approach.

Terms to exemplify orientation, such as upper/lower, left/right, top/bottom, and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Various embodiments are implemented in accordance with the underlying Provisional Application (Ser. No. 62/198,550), entitled "Methods and Apparatus Concerning Sensitive (E-Skin) Pressure Sensors", filed Jul. 29, 2015, and with six Appendices, to which benefit is claimed and which are fully incorporated herein by reference. For instance, embodiments herein and/or in the provisional application (including the appendices therein) may be combined in varying degrees (including wholly). Reference may also be made to the experimental teachings and underlying references provided in the underlying provisional application, including the Appendices that form part of the provisional application. Embodiments discussed in the Appendices are not intended, in any way, to be limiting to the overall technical disclosure, or to any part of the claimed invention unless specifically noted.

The Appendices of the underlying Provisional Application are hereby fully incorporated by reference for their general and specific teachings. Appendix A entitled "A Chameleon-Inspired Stretchable Electronic Skin with Interactive Color-Changing Controlled by Tactile Sensing", generally and specifically describes various force sensors, sensor circuitry, methods of forming the same, and methods of use as illustrated here. Appendix B entitled "Resistive Pressure Sensor", generally and specifically describes sensing of force, resistance change and mechanical stimuli, different placement of the conductive material on the structures, including conductive material located within the structures, as well as applications directed to tuning the resistive response and/or resistance switching range of the force sensor. Appendix C entitled "A Chameleon-Inspired Stretchable Electronic Skin with Interactive Color-Changing Controlled by Tactile Sensing", generally and specifically describes the sensing of force, the color-changing in response to tactile sensing, as well as the tune-ability of the resistive response. Appendix D, a published paper entitled "Multifunctional, flexible electronic systems based on engineered nanostructured materials", generally and specifically describes circuitry, modules and architecture of the electronic devices. Appendix E entitled "Engineering-Specific Illustrations", generally and specifically describes integrating the electronic force sensor and sensor circuitry with and/or into wearable devices, such as a smart-watch, and different placement of the electrochromic material (such as in clothing), as well as applications directed to integrating the electronic skin pressure sensor and sensor circuitry into prosthetics and smart robots. Appendix F entitled "Resistive Pressure Sensors Technology Comparison", generally and specifically describes the contact resistance and pressure range of electronic force sensor and sensor circuitry, as well as applications directed to tuning the resistive response and/or resistance switching range of the pressure sensor as compared to other circuitry. These documents are fully incorporated herein by reference for their teachings (including background references cited therein and which disclose applications beneficial to aspects of the present disclosure), generally and specifically, to the structures, processes, methods and uses described and shown therein.

As illustrated, various modules and/or other circuit-based building blocks (shown in the immediately preceding figure) may be implemented to carry out one or more of the operations and activities described herein or in the Appendices, and/or shown in the block-diagram-type figures. In such contexts, these modules and/or building blocks represent circuits that carry out one or more of these or related operations/activities. For example, in certain of the embodiments discussed above and in the Appendices, one or more modules and/or blocks are discrete logic circuits or programmable logic circuits configured and arranged for implementing these operations/activities, as in the circuit modules/blocks shown above and in the Appendices. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules/blocks include a combination of a CPU hardware-based circuit and a set of instructions in the form of firmware, where the first module/block includes a first CPU hardware circuit with one set of instructions and the second module/block includes a second CPU hardware circuit with another set of instructions.

Various embodiments described above, and discussed in the Appendices of the provisional application may be implemented together and/or in other manners. One or more of the items depicted in the present disclosure and in the Appendices can also be implemented separately or in a more integrated manner, or removed and/or rendered as inoperable in certain cases, as is useful in accordance with particular applications. For example, the particular structures illustrated as shown and discussed may be replaced with other structures and/or combined together in the same electronic force sensor and/or use in addition with the ECD. In view of the description herein, those skilled in the art will recognize that many changes may be made thereto without departing from the spirit and scope of the present disclosure.

What is claimed is:

1. An apparatus including:
   an electronic force sensor including:
      a first opposing electrode;
      a second opposing electrode, wherein the first and second opposing electrodes are configured and arranged to generate an output indicative of a force applied to the electronic force sensor; and
   a plurality of recoverably-deformable structures arranged between the first and the second opposing electrodes and having a plurality of conductive-resistive elements, each of the structures including at least one of a variable conductor and a variable resistor and configured and arranged with attributes, including shape and material composition attributes, that set a force sensitivity of the electronic force sensor, wherein the plurality of conductive-resistive elements includes at least one conductive portion and at least one resistive portion; and
   sensor circuitry configured and arranged to output a signal indicative of the amount of force applied based on the output from the electronic force sensor.

2. The apparatus of claim 1, wherein the conductive-resistive elements include non-conductive material at a first portion of the plurality of recoverably-deformable structures and at least a conductive material at a second portion of the plurality of recoverably-deformable structures.

3. The apparatus of claim 1, wherein the plurality of recoverably-deformable structures are configured and arranged to provide a resistance that is above hundreds of kOhms in response to no force applied and to reduce the resistivity of the electronic force sensor, by orders of magnitudes, in response to the force applied.

4. The apparatus of claim 1, wherein the electronic force sensor further includes a polymer layer configured and arranged with the sensor circuitry to change a physical color of the electronic force sensor, the change in physical color corresponding to the amount of force applied.

5. The apparatus of claim 1, wherein the resistive portion is proximal to the first opposing electrode and includes a non-conductive material or is not covered in a conductive material, wherein the at least one of the variable conductor is at least predominantly conductive when uncompressed and the variable resistor is at least predominantly resistive when uncompressed.

6. The apparatus of claim 1, wherein the resistive portion includes at least one side portion of the at least one recoverably-deformable structure and includes a non-conductive material or is not covered in a conductive material.

7. The apparatus of claim 1, wherein the conductive portion includes multiple sides of the at least one recoverably-deformable structure that have different concentrations of conductive material with respect to one another, such that at least one recoverably-deformable structure is configured and arranged to provide different resistivity in response to a same amount of force applied in different directions.

8. The apparatus of claim 7, wherein the sensor circuitry is configured and arranged to differentiate between different stimuli based on the different resistivity based on outputs from the electronic force sensor.

9. The apparatus of claim 1, wherein at least one of the conductive-resistive elements include a resistive portion and a conductive portion that are within the at least one of the plurality of recoverably-deformable structures, wherein a conductive material is arranged within the at least one recoverably-deformable structure in the conductive portion as a ratio of conductive material to non-conductive material.

10. The apparatus of claim 9, wherein the conductive material is arranged within the at least one of the plurality of recoverably-deformable structures at a higher ratio of conductive material to non-conductive material at the conductive portion compared to the ratio of conductive material to non-conductive material at the resistive portion.

11. The apparatus of claim 9, wherein the conductive material is arranged within the plurality of recoverably-deformable structures in multiple layers.

12. An electronic force sensor comprising:
a first opposing electrode;
a second opposing electrode, wherein the first and second opposing electrodes are configured and arranged to generate an output indicative of a force applied to the electronic force sensor; and
a plurality of recoverably-deformable structures arranged between the first and the second opposing electrodes and having a plurality of conductive-resistive elements, each of the structures including at least one of a variable conductor, being at least predominantly conductive when uncompressed, and a variable resistor, being at least predominantly resistive when uncompressed, and having a conductive portion and a resistive portion, and configured and arranged with conductive material and non-conductive material that set a force sensitivity of the electronic force sensor.

13. The electronic force sensor of claim 12, wherein one of the first and the second opposing electrodes and the plurality of recoverably-deformable structures are formed as a film, wherein at least one of the plurality of structures include the conductive portion having the conductive material and the resistive portion having the non-conductive material.

14. The electronic force sensor of claim 12, wherein the plurality of recoverably-deformable structures are configured and arranged to provide a higher resistivity in response to no force or low force applied than a resistivity provided in response to a greater force applied.

15. The electronic force sensor of claim 12, wherein the plurality of recoverably-deformable structures provide a threshold resistance switching range based on at least one of an amount or location of the conductive material or non-conductive material.

16. The electronic force sensor of claim 12, further including a polymer layer configured and arranged to change a physical color of the electronic force sensor, wherein the change in the physical color includes at least one of different colors or different intensities of one or more colors that is indicative of the amount of force applied.

17. The electronic force sensor of claim 12, wherein the conductive material includes nanostructures including at least one selected from the group consisting of carbon nanotubes, nanowires, metal, and a combination thereof.

18. An apparatus including:
an electronic force sensor including circuitry configured and arranged to generate an output indicative of a force applied to the electronic force sensor, wherein the circuitry includes a plurality of recoverably-deformable structures, the plurality of recoverably-deformable structures having a conductive portion and a resistive portion, and configured and arranged with attributes, including shape and material composition attributes, that are set with respect to one another for setting force sensitivity of the electronic force sensor; and
sensor circuitry configured and arranged to output an indicative of the amount of force applied based on the output from the electronic force sensor.

19. The apparatus of claim 18, wherein the attributes include at least one selected from the group consisting of: a location of conductive material in relation to the structures, a location of non-conductive material of the structures in relation to the conductive material, a threshold resistance of switching, a resistivity provided in response to no force applied to the electronic force sensor, and a combination thereof.

20. The apparatus of claim 18, wherein at least one of the plurality of recoverably-deformable structures include non-conductive material at the resistive portion and are at least partially covered in a conductive material at the conductive portion, and configured and arranged to change a resistivity of the electronic force sensor in response to the force applied.

21. The apparatus of claim 18, wherein the resistive portion of at least one of the plurality of recoverably-deformable structures includes at least one side portion of the at least one recoverably-deformable structure and includes a non-conductive material or is not covered in a conductive material.

22. The apparatus of claim 18, wherein the conductive portion of at least one of the plurality of recoverably-deformable structures includes multiple sides of the at least one structure and includes different concentrations of conductive material, such that the at least one recoverably-deformable structure is configured and arranged to provide different resistivity in response to the same amount of force-applied in different directions.

* * * * *